US009123379B2

(12) United States Patent
Higaki et al.

(10) Patent No.: US 9,123,379 B2
(45) Date of Patent: Sep. 1, 2015

(54) DISK

(71) Applicant: Panasonic Corporation, Osaka (JP)

(72) Inventors: Hitoshi Higaki, Osaka (JP); Norikatsu Yoshida, Hyogo (JP); Tatsuro Nishi, Osaka (JP); Yuji Ariyoshi, Osaka (JP); Takuto Yamazaki, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/498,022

(22) Filed: Sep. 26, 2014

(65) Prior Publication Data

US 2015/0024161 A1 Jan. 22, 2015

Related U.S. Application Data

(63) Continuation of application No. PCT/JP2013/000577, filed on Feb. 1, 2013.

(30) Foreign Application Priority Data

Mar. 28, 2012 (JP) ................................. 2012-073441
Jun. 4, 2012 (JP) ................................. 2012-127164

(51) Int. Cl.
G11B 3/70 (2006.01)
G11B 23/00 (2006.01)
G11B 23/03 (2006.01)
G11B 17/22 (2006.01)

(52) U.S. Cl.
CPC .......... *G11B 23/0035* (2013.01); *G11B 17/225* (2013.01); *G11B 23/0323* (2013.01); *G11B 23/0328* (2013.01); *G11B 2220/2508* (2013.01); *G11B 2220/41* (2013.01)

(58) Field of Classification Search
None
See application file for complete search history.

(56) References Cited

U.S. PATENT DOCUMENTS

| 4,634,617 | A | * | 1/1987 | Ohta et al. ................... 428/65.2 |
| 5,438,564 | A | * | 8/1995 | Takahashi ..................... 720/722 |
| 5,448,547 | A | * | 9/1995 | Minoda et al. ................ 369/280 |
| 5,481,512 | A |   | 1/1996 | Morioka et al. |
| 5,999,513 | A | * | 12/1999 | Arakawa et al. .............. 369/282 |
| 6,064,544 | A |   | 5/2000 | Wada |
| 6,304,525 | B1 |   | 10/2001 | Hayashi et al. |
| 6,411,594 | B1 | * | 6/2002 | Yamazaki ..................... 369/282 |
| 6,744,704 | B1 |   | 6/2004 | Funaya et al. |
| 8,245,247 | B2 |   | 8/2012 | Honma |

(Continued)

FOREIGN PATENT DOCUMENTS

| JP | 4-61080 | 2/1992 |
| JP | 5-128695 | 5/1993 |

(Continued)

OTHER PUBLICATIONS

Computer Translation of JP 2002-251784, Sep. 6, 2002.*

(Continued)

*Primary Examiner* — Tan X Dinh
(74) *Attorney, Agent, or Firm* — Wenderoth, Lind & Ponack, L.L.P.

(57) ABSTRACT

A disk (100) having a center hole (100*a*), the disk (100) being provided with a support-capable structure for making it possible to support a disk (100A) positioned one level above the lowermost part in a stacked state using separation claws (164Ac, 164Bc) protruding radially outward from the center hole (100*a*).

7 Claims, 39 Drawing Sheets

(56) References Cited

U.S. PATENT DOCUMENTS

| | | |
|---|---|---|
| 8,413,179 B2 | 4/2013 | Inoue |
| 2002/0036976 A1 | 3/2002 | Michimori et al. |
| 2004/0013417 A1 | 1/2004 | Matsuda et al. |
| 2007/0268790 A1 | 11/2007 | Arai |
| 2013/0263162 A1 | 10/2013 | Yoshida et al. |
| 2013/0326549 A1 | 12/2013 | Nishi et al. |

FOREIGN PATENT DOCUMENTS

| | | |
|---|---|---|
| JP | 6-20423 | 1/1994 |
| JP | 2000-117553 | 4/2000 |
| JP | 2002-109813 | 4/2002 |
| JP | 2002-203339 | 7/2002 |
| JP | 2002-251784 | 9/2002 |
| JP | 2004-54998 | 2/2004 |
| JP | 2005-25888 | 1/2005 |
| JP | 2006-12331 | 1/2006 |
| JP | 2010-192071 | 9/2010 |
| JP | 2011-204311 | 10/2011 |

OTHER PUBLICATIONS

International Search Report issued May 14, 2013 in International (PCT) Application No. PCT/JP2013/000577.

International Preliminary Report on Patentability and Written Opinion of the International Searching Authority issued Oct. 9, 2014 in corresponding International (PCT) Application No. PCT/JP2013/000577.

\* cited by examiner

Fig. 28
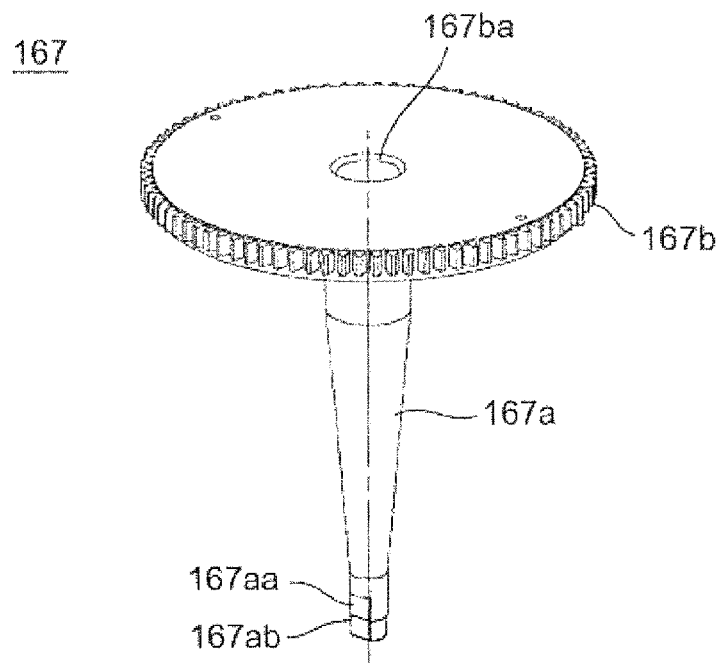
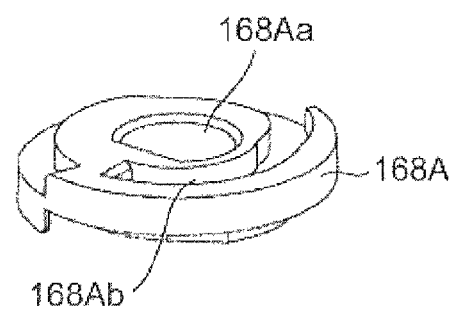
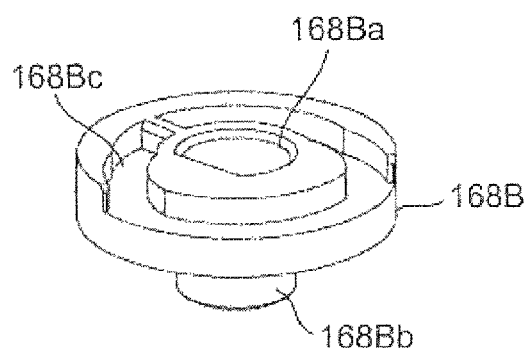

Fig. 29
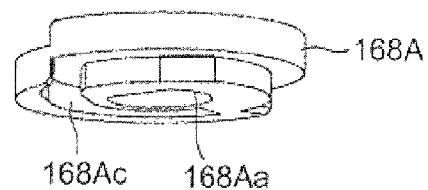
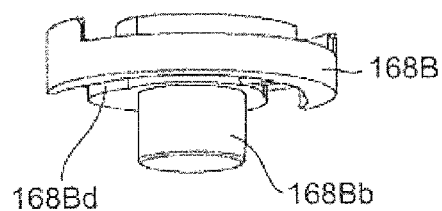
Fig. 30A
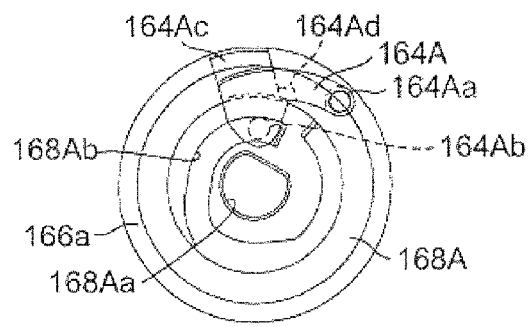
Fig. 30B
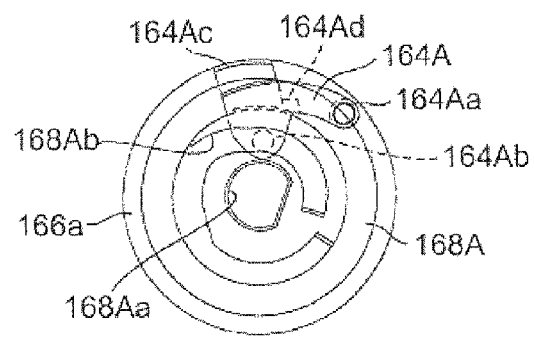

DISK

CROSS-REFERENCE TO RELATED APPLICATIONS

This is a continuation application of International Application No. PCT/JP2013/000577 filed on Feb. 1, 2013, which claims priority of Japanese Patent Application Nos. 2012-073441 filed on Mar. 28, 2012 and 2012-127164 filed on Jun. 4, 2012, the disclosures of which are incorporated herein by reference in their entireties.

BACKGROUND

1. Technical Field

The present disclosure relates to a disk, and particularly to a disk having a structure enabling a disk located one higher than a lowermost portion among stacked disks to be supported.

2. Description of the Related Art

Conventionally, as a disk device for supplying this type of disks, for example, a device described in Japanese Patent Application Laid-Open No. 2011-204311 has been known. The disk device of Japanese Patent Application Laid-Open No. 2011-204311 includes a magazine containing a plurality of trays each containing one disk, and a plurality of disk drives. In the disk device of Japanese Patent Application Laid-Open No. 2011-204311, an arbitrary tray is brought out from the magazine, and one disk contained in the brought-out tray is suction-held on a suction pad to place the disk on a tray of an arbitrary disk drive.

Since the disk device of Japanese Patent Application Laid-Open No. 2011-204311 is configured so that one disk is contained in one tray, a number of disks contained in the magazine is small. In order to increase the number of the disks contained in the magazine, it is considered to be effective to directly stack the plurality of disks without mediating the trays to decrease the number of the trays.

In this case, the disks adjacent to each other stick to each other and it becomes difficult to easily separate them. As a technique to solve this problem, there is a technique disclosed in Japanese Patent Application Laid-Open No. 2000-117553. In Japanese Patent Application Laid-Open No. 2000-117553, there is disclosed a technique of inserting claw portions between the two disks adjacent to each other to thereby separate the two disks, and suction-holding the separated disk on a suction pad.

SUMMARY

In the disk device, further increase in the number of contained disks has been demanded. In order to increase the number of contained disks, it is simply considered to increase the number of magazines.

However, the increase in the number of magazines necessarily increases a distance between the magazine arranged farthest from the disk drive, and the relevant disk drive, which increases conveyance time of the disk in turn. Moreover, since the disk device of Japanese Patent Application Laid-Open No. 2011-204311 is configured so that the disks are supplied to the disk drives from the magazine one by one, it takes a long time to supply the disks to the plurality of disk drives, respectively.

Moreover, as for the technique of Japanese Patent Application Laid-Open No. 2000-117553, time required for supplying the disks to the plurality of disk drives, respectively cannot be reduced. Moreover, when the stacked disks are separated, the substrate separating claws provided in an ejection arm need to be inserted in a slight gap obtained by ribs formed in the disks. Thus, although the ejection arm is positioned with high accuracy in a vertical direction, a mechanism for this is inevitably expensive. Moreover, although the substrate separating claws need to be thin, it is difficult to obtain enough strength to support the disk, and there is a possibility of deformation during use.

Consequently, one non-limiting and exemplary embodiment provides a disk that can be separated easily and properly in a stacked state.

As a solution to the above problem, the present disclosure provides a disk with a central hole, including a supportable structure in an inner circumferential portion, the supportable structure enabling a disk located one higher than an arbitrary disk to be supported by separation claws projected on an outer diameter side from the central hole.

According to the present disclosure, since the disk is formed with the supportable structure, the separation claws do not interfere with the disks when the disks are supported by the separation claws, and the disk located one higher than the arbitrary one disk can be supported smoothly.

BRIEF DESCRIPTION OF THE DRAWINGS

FIG. 28 is an exploded perspective view of a cam shaft unit that the disk chuck unit in FIG. 23 includes.

FIG. 29 is a perspective view when two cam plates that the cam shaft unit in FIG. 28 includes are viewed from an obliquely lower side.

FIG. 30A is a view showing how a driving pin of one separator hook slides in a cam groove formed in an upper surface of one of the cam plates.

FIG. 30B is a view showing how a driving pin of one separator hook slides in a cam groove formed in an upper surface of one of the cam plates.

PREFERRED EMBODIMENT

Figure 1:
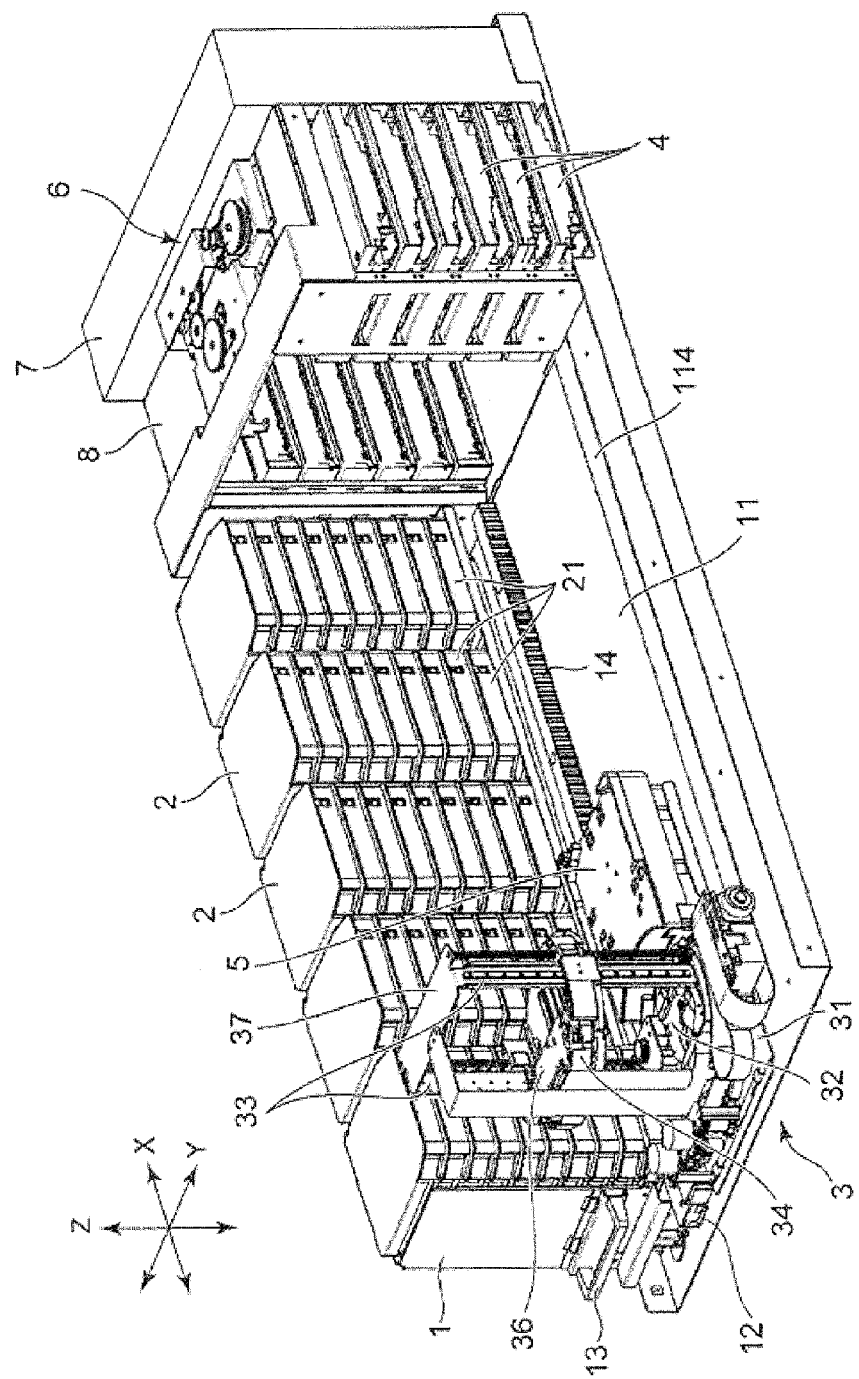
FIG. 1 is a perspective view showing a schematic configuration of a disk device according to an embodiment of the present disclosure.

A disk can have the following aspects.

A first aspect provides a disk with a central hole, including a supportable structure in an inner circumferential portion, the supportable structure enabling a disk located one higher than an arbitrary disk to be supported by separation claws projected on an outer diameter side from the central hole.

According to the first aspect, when the separation claws are projected on the outer diameter side from the central holes of the disks, the disk located one higher than the arbitrary one disk can be supported smoothly and effortlessly, using the supportable structure.

A second aspect provides the disk in which the supportable structure is configured by a release portion formed in an upper-surface inner circumferential portion of the disk.

A third aspect provides the disk in which the supportable structure is configured by a release portion formed in a lower-surface inner circumferential portion of the disk.

According to the second and third aspects, the simple configuration in which the release portion is only formed in the disk enables the disk located one higher than the lowermost portion to be supported by the separation claws.

A fourth aspect provides the disk in which the release portion has a horizontal surface on an inner circumferential side.

According to the fourth aspect, a gap having a large interval can be formed between the disks adjacent in a vertical direction from an inner circumferential surface side to an outer diameter direction. Accordingly, required positional accuracy in the vertical direction of the separation claws need not be so high. Moreover, even thick separation claws can be used.

A fifth aspect provides the disk in which the supportable structure is configured by a depressed portion formed in an inner circumferential surface of the disk.

According to the fifth aspect, since the depressed portion is formed in the inner circumferential surface of the disk, the separation claws are arranged on the inner circumferential side of the disk to be projected on the outer diameter side, which allows the separation claws to be easily located in the depressed portion and support the disk. Since the depressed portion is only formed in the inner circumferential surface of the disk, even a disk having storage layers on both sides can be supported by the separation claws.

A sixth aspect provides the disk in which the supportable structure is configured by a projected portion projected from an inner circumferential surface of the disk.

According to the sixth aspect, since the projected portion is formed in the inner circumferential surface of the disk, the separation claws are arranged inside the projected portion to be projected on the outer diameter side, which allows the separation claws to easily support the disk by the projected portion. Since the projected portion is only formed in the inner circumferential surface of the disk, even the disk having the storage layers on both sides can be supported by the separation claws.

A seventh aspect provides the disk in which the supportable structure is configured by a rib projected from at least any one of an upper surface or a lower surface of an inner circumferential portion of the disk.

According to the sixth and seventh aspects, the separation claws are projected inside the inner circumferential surface of the disk on the outer diameter side from the inner side of the projected portion or the rib, by which the disk can be supported through the projected portion or the rib.

Moreover, a disk device can have the following aspects.

An eighth aspect is a disk device that supplies a disk to each of a plurality of disk drives, including:

a tray that holds the disks having any one of the above-described configurations in a state where the plurality of disks are stacked; and a carrier that has separation claws capable of supporting the disk located one higher than a lowermost portion of the plurality of held disks, and supports the disk located one higher than the lowermost portion by the separation claws above a tray ejected from an arbitrary disk drive to thereby separate the one disk located in the lowermost portion and place the same on the tray.

According to the eighth aspect, since the disk has the supportable structure, the disk located one higher than the lowermost portion can be supported easily and smoothly by the separation claws. Time required for supplying the disks to the respective disk drives can be reduced.

In a ninth aspect, the carrier includes a spindle unit to be inserted into the central hole of the disk, and the separation claws can move to a withdrawal portion where the separation claws withdraw inside the spindle unit, and to a projection position where the separation claws project into a release portion of the disk to be enabled to support a lower-surface inner circumferential portion of the disk one higher than the lowermost portion.

According to the ninth aspect, since the disk includes the supporting structure, only moving the separation claws from the withdrawal position to the projection position allows the lower-surface inner circumferential portion of the disk located one higher than the lowermost portion to be supported easily and smoothly without interference of the separation claws with the stacked disks.

In a tenth aspect, the separation claws can move to the withdrawal position and to the projection portion in conjunction with rotation operation of a cam shaft inserted into the spindle unit.

According to the tenth aspect, only by rotating the cam shaft, the separation claws can be moved to the withdrawal position and to the projection position.

In an eleventh aspect, the carrier includes:

the spindle unit to be inserted into the central hole of the disk;

the separation claws; and supporting claws that can support the lower-surface inner circumferential portion of the disk located in the lowermost portion, wherein the separation claws and the supporting claws can move to a contained position where both the separation claws and the supporting claws withdraw inside the spindle unit, to a supporting position where only the supporting claws are projected outside the spindle unit, to a switching position where both the separation claws and the supporting claws are projected outside the spindle unit, and to a separating position where only the separation claws are projected outside the spindle unit.

According to the eleventh aspect, from a state where the disks are supported by the supporting claws at the supporting position, the disk one higher than the lowermost portion is supported by the separation claws at the separating position, and then, only the lowermost disk can be separated by withdrawing the supporting claws at the switching position.

In a twelfth aspect, the separation claws and the supporting claws can be moved in order of the contained position, the supporting position, the switching position, and the separating position with the rotation of the cam shaft inserted into the spindle unit.

According to the twelfth aspect, only rotating the cam shaft sequentially moves the separation claws and the supporting claws to the contained position, the supporting position, the switching position, and the separating position in order, so that the disk located in the lowermost portion can be surely separated.

In a thirteenth aspect, the separation claws and the supporting claws are located at the contained position when the spindle unit is inserted into the central holes of the disks, the spindle unit is inserted into the central holes until the supporting claws are located below the lowermost disk, the movement from the contained position to the supporting position allows the supporting claws to support the lower-surface inner circumferential portion of the lowermost disk, and when the supporting claws support the lowermost disk, the position moves to the switching position, and when the supporting claws are conveyed to an upper side of the tray in a state supporting the lowermost disk, the position moves from the switching position to the separating position.

According to the thirteenth aspect, in accordance with a lift position of the spindle unit, the separation claws and the supporting claws can be projected or withdrawn properly for the disks, so that only the disk located in the lowermost portion can be surely separated.

In a fourteenth aspect, the separation claws each have an inclined surface formed so that a thickness thereof becomes larger downward from an outer circumferential side to an inner circumferential side, and at the separation position, the separation claws are projected outside the spindle unit more than at the switching position to press the disk located in the lowermost portion downward by the inclined surfaces.

According to the fourteenth aspect, only by projecting the separation claws outside from the state where the lower-surface inner circumferential portion of the disk located one higher than the lowermost portion is supported by the separation claws, the lowermost disk is pressed by the pressing surfaces, thereby being separated easily and surely.

Hereinafter, embodiments of the present disclosure will be described with reference to the drawings. In all of the following drawings, the same or corresponding portions are given the same reference numerals and redundant descriptions are omitted.

FIG. 1 is a perspective view showing a schematic configuration of a disk device. In the following description, a lower left side of FIG. 1 is referred to as a "device front side", and an upper right side of FIG. 1 is referred to as a "device back side".

First, an entire configuration of the disk device will be described with reference to FIG. 1.

The disk device includes two magazine stockers 1, 1. The two magazine stockers 1, 1 are provided so as to be opposed to each other in a device width direction Y on a bottom chassis 11. In FIG. 1, illustration of one (on a front side on paper) of the magazine stockers 1 is omitted. Moreover, in FIG. 1, illustration of a top plate and partition plates of the magazine stocker 1 is omitted.

A plurality of magazines 2 are contained in each of the magazine stockers 1. Each of the magazines 2 has a magazine tray 21 containing a plurality of (e.g., 12) disks. A picker 3 is provided between the two magazine stockers 1, 1, the picker 3 bringing out the magazine tray 21 from the one magazine 2 selected from the plurality of magazines 2 to hold the magazine tray 21.

The picker 3 is configured so as to convey the held magazine tray 21 to a vicinity of a plurality of disk drives 4 arranged on the device back side. In the picker 3, a lifter 5 that pushes a plurality of disks 100 from the magazine tray 21 is integrally provided.

The disk drives 4 are devices that perform recording or reproduction of information with respect to the disks 100. Moreover, the disk drives 4 are each a tray type disk drive that loads the disk, using a tray 4a (refer to FIG. 44). The plurality of disk drives 4 are stacked in a device height direction Z, and are arranged adjacent to the respective magazine stockers 1, 1 on the device back side. A carrier 106 is provided between the plurality of disk drives 4 arranged adjacent to one of the magazine stockers 1 in the stacked manner, and the plurality of disk drives 4 arranged adjacent to the other magazine stocker 1 in the stacked manner.

The carrier 106 is configured so as to hold the plurality of disks 100 pushed out by the lifter 5 in a stacked state, separate one disk 100 from the plurality of held disks above the tray 4a ejected from the arbitrary disk drive 4, and place the separated disk 100 on the tray 4a.

Figure 44:
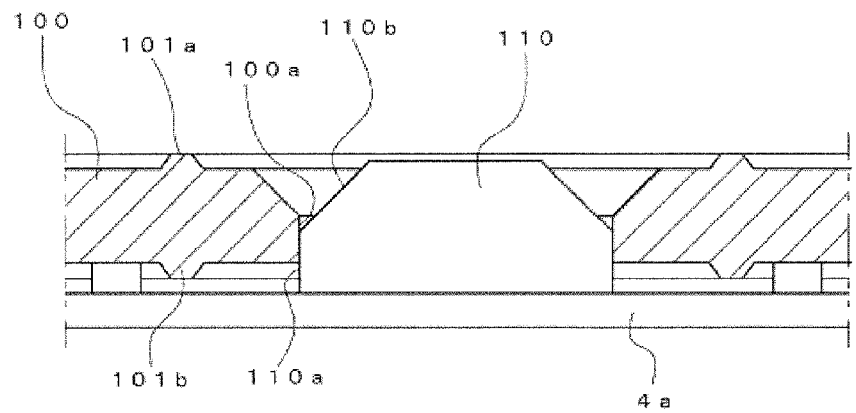
FIG. 44 is a cross-sectional view showing a state where a shaft inside the disk drive is inserted into a central hole of the disk.
Figure 45A:
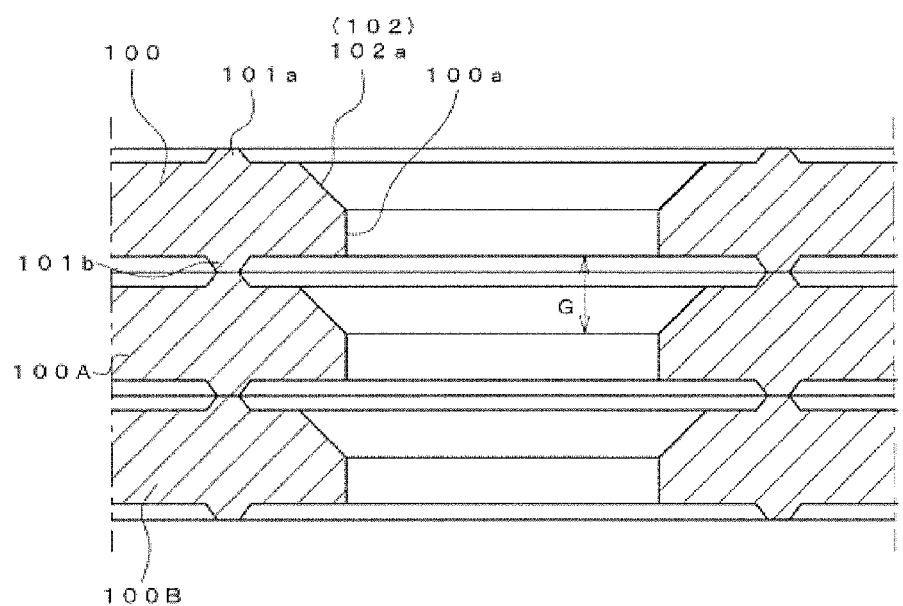
FIG. 45A is a cross-sectional view showing a disk formed with a release portion by a tapered surface in an upper-surface inner circumferential portion.

The tray 4a is collected inside the disk drive 4, and a center cone 110 of a spindle motor (not shown) is inserted into a central hole 100a of the placed disk 100, as shown in FIG. 44. The center cone 110 includes a cylindrical surface 110a engaged with the central hole 100a of the disk 100, and a conical surface 110b an outer diameter dimension of which gradually becomes smaller toward a tip. The separated disk 100 is guided in the central hole 100a by the conical surface 110b, and centering of the disk 100 is performed by the cylindrical surface 110a. In FIG. 44, a surface of the disk 100 located on the upper side is a disk upper surface, a surface located on the lower side is a disk lower surface, and a recording surface is formed in this disk lower surface. Moreover, while in FIG. 44, as a release portion of the disk 100, a configuration described in FIG. 45A is employed, release portions in FIGS. 45B, 45C and the like can be applied similarly.

On the device back side with respect to the carrier 106 and the plurality of disk drives 4, an electric circuit and a power supply 7 are provided. In the electric circuit and the power supply 7, there is provided a controller that controls operations (motors or the like) of the respective devices such as the picker 3, the disk drives 4, the carrier 106, and the like. The controller is connected to a host computer that manages data. The host computer transmits commands to the controller so as to perform operations such as writing and reading of the data with respect to the specified magazine 2, based on an instruction of an operator. The controller controls the operations of the respective devices such as the picker 3, the disk drives 4, the carrier 106, and the like in accordance with the commands.

Next, configurations of the above-described respective devices and parts will be described in detail.

The magazine stocker 1 is provided along a guide rail 12 that slidably guides the picker 3. The guide rail 12 is provided so as to extend in a device depth direction X (a longitudinal direction of the magazine stocker 1). In a side surface of the magazine stocker 1 on the device front side, a grip 13 is provided. Drawing the grip 13 can move the magazine stocker 1 to the device front side. Each of the magazine stockers 1 includes the partition plates (not shown) formed into a lattice shape when viewed from the device width direction Y. The magazine 2 is contained in each space surrounded by the partition plates.

Figure 2A:
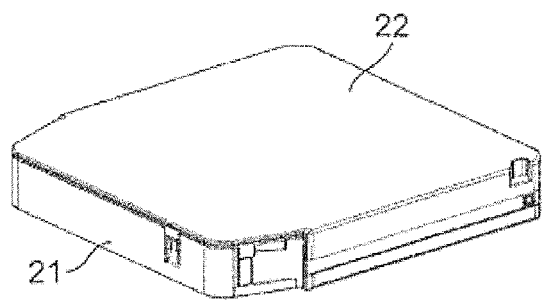
FIG. 2A is a perspective view of a magazine that the disk device in FIG. 1 includes.
Figure 2B:
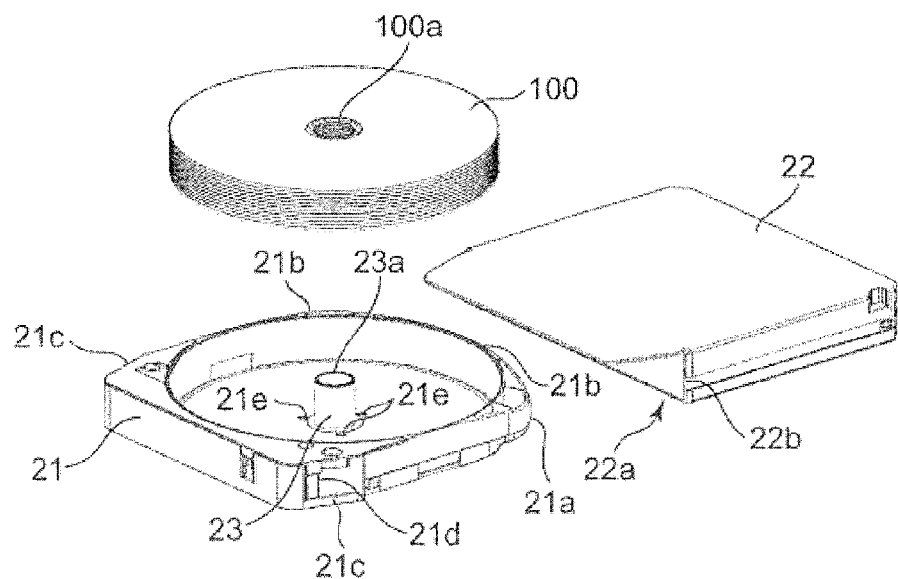
FIG. 2B is an exploded perspective view of the magazine in FIG. 2A.

The magazine 2 includes the magazine tray 21, and a case 22 having a substantially rectangular parallelepiped shape to contain the magazine tray 21, as shown in FIG. 2A. In a front surface (one side surface) of the case 22, an opening portion 22a which the magazine tray 21 can be inserted into or brought out from is provided, as shown in FIG. 2B.

An outer shape of the magazine tray 21 is substantially rectangular in planer view. The magazine tray 21 contains the plurality of disks 100 with the disks 100 sticking to each other and stacked. In both corner portions located on a back side of the case 22 when the magazine tray 21 is contained inside the case 22, cut portions 21a, 21a are formed. Moreover, an entire side surface 21b located on the back side of the case 22 and including the cut portions 21a, 21a when the magazine tray 21 is contained inside the case 22 is formed into an arc shape.

The disk 100 has the central hole 100a, and upper surface-side annular ribs 101a and lower surface-side annular ribs 101b (outer-side ones are not shown) are formed on upper and lower surface, inner and outer circumferential sides. Moreover, a supportable structure is formed in an inner circumferential portion of the disk 100.

As the supportable structure, various types thereof can be employed.

For example, in FIG. 45A, a release portion 102 formed by a tapered surface 102a gradually expanding on an outer diameter side as it goes upward in an upper-surface inner circumferential portion of the disk 100 is configured. Specifically, when a thickness of the disk 100 is 1.2 mm, a formed gap G can be set to a value (0.8 mm) obtained by adding a gap formed by the tapered surface 102a (0.65 mm) to a gap formed by the annular ribs 101a, 101b (0.15 mm).

Figure 45B:
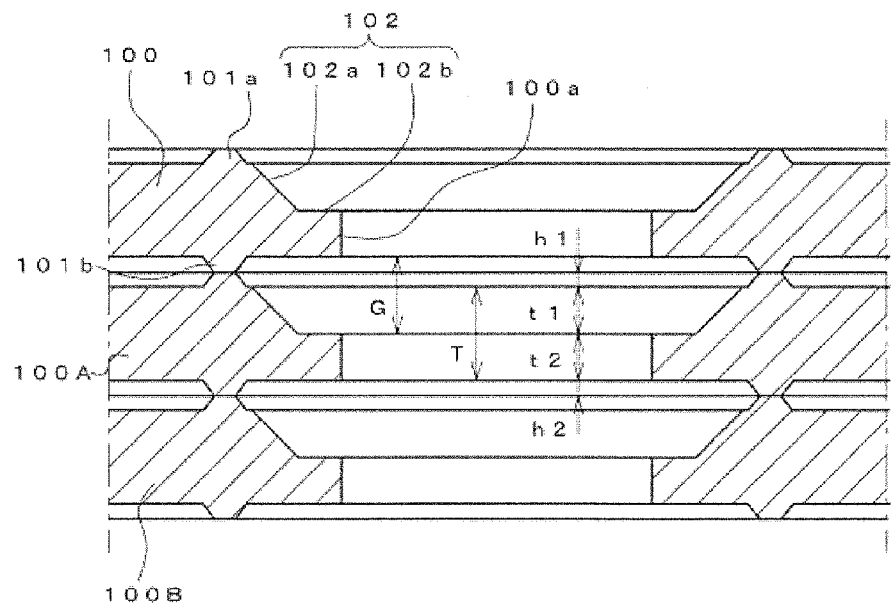
FIG. 45B is a cross-sectional view showing a disk formed with a release portion by a tapered surface and a horizontal surface in an upper-surface inner circumferential portion.

In FIG. 45B, the release portion 102 is configured so that a horizontal surface 102b extends on an inner diameter side from the middle of the tapered surface 102a. Specifically, when a thickness T of the disk 100 is 1.2 mm, a formed gap G can be set to a value (0.8 mm) obtained by adding a gap t1 (0.65 mm) formed by the tapered surface 102a to a gap formed by the annular ribs 101a, 101b, that is, a sum (0.15 mm) of a height dimension h1 of the annular rib 101a (0.05 mm) and a height dimension h2 of the annular rib 101b (0.1 mm). In this configuration as well, the gap G (0.8 mm) similar to the gap shown in FIG. 45A can be obtained, and the interval can be maintained toward the outer diameter side across an area where the horizontal surface 102b is located. The disk 100 is guided in an area of a thickness t2 (0.55 mm) (the inner circumferential surface) by the cylindrical surface 110a of the foregoing center cone 110.

Figure 45C:
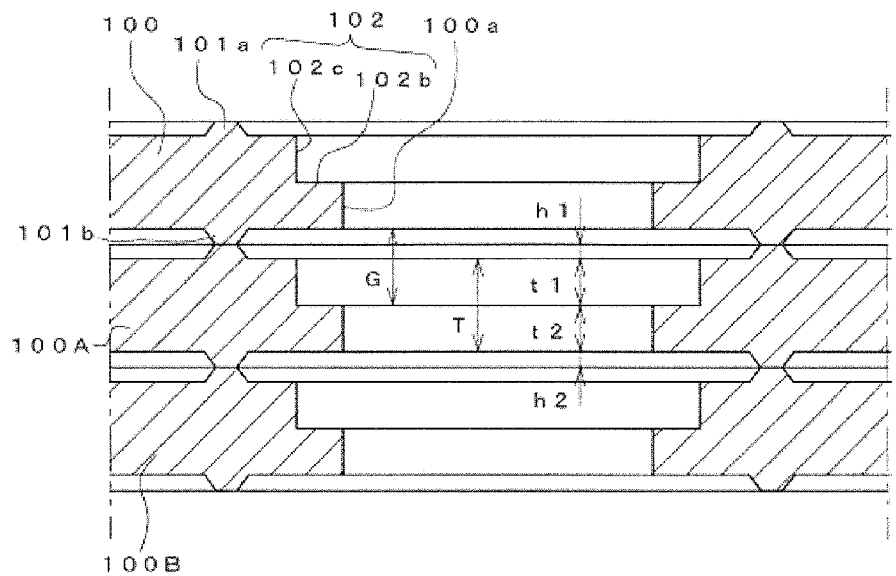
FIG. 45C is a cross-sectional view showing a disk formed with a release portion by a cylindrical surface and a horizontal surface in an upper-surface inner circumferential portion.

In FIG. 45C, the release portion 102 is formed by the horizontal surface 102b and a cylindrical surface 102c. Specific vertical dimensions are the same as those shown in FIG. 45B.

In this manner, in FIGS. 45A to 45C, since the centering is performed on the lower side of the disk 100, the release portion 102 is formed on the upper side.

Figure 45D:
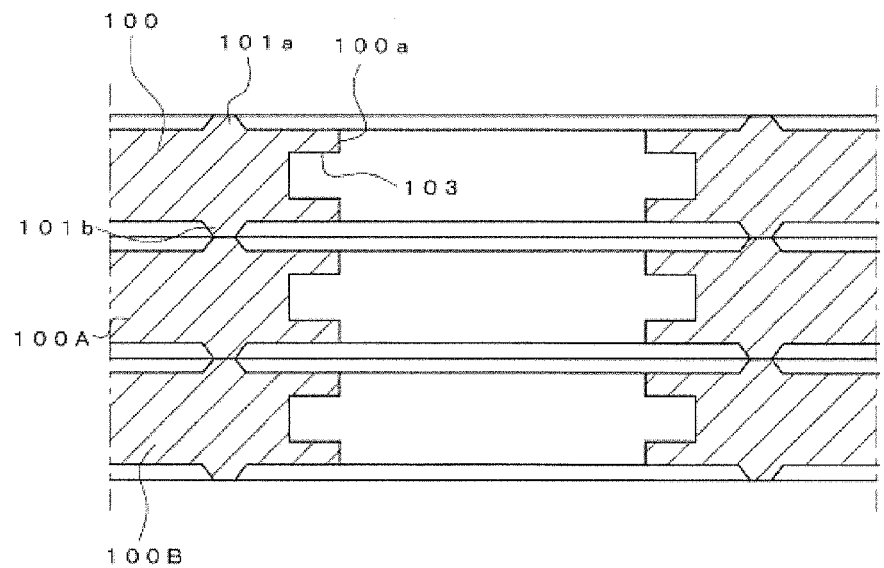
FIG. 45D is a cross-sectional view showing a disk formed with an annular depressed portion in an inner surface.

In FIG. 45D, an annular depressed portion 103 depressed toward the outer diameter side is formed in the inner circumferential surface of the disk 100. The depressed portion 103 is formed in a central portion in a thickness direction of the disk 100.

Figure 45E:
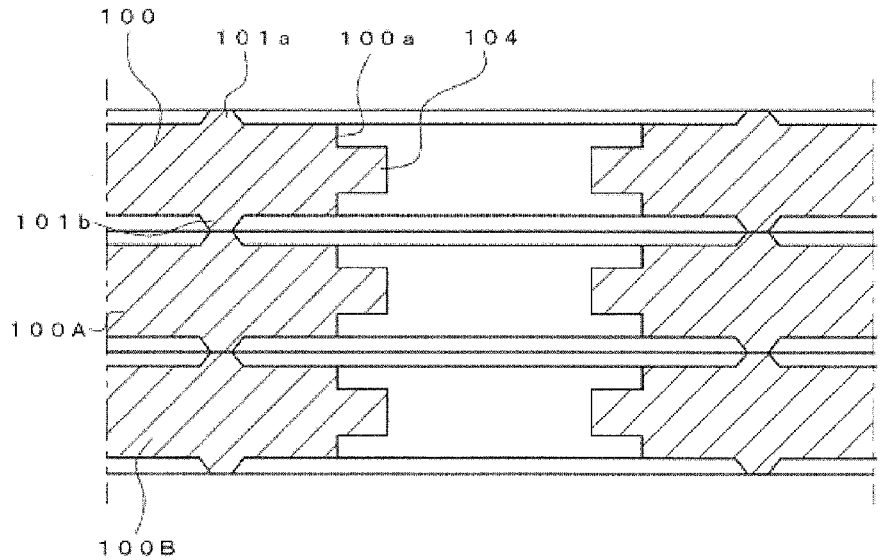
FIG. 45E is a cross-sectional view showing a disk formed with an annular projected portion in an inner surface.

In FIG. 45E, an annular projected portion 104 projected on the inner diameter side is formed in the inner circumferential surface of the disk 100. The projected portion 104 is formed in the central portion in the thickness direction of the disk 100. However, the projected portion 104 need not be continued annually. Moreover, an inner circumferential surface of the projected portion 104 may be used as a hole for centering.

As to the disks 100, the upper surface-side annular ribs 101a of a lower disk 100B abut on the lower surface-side annular ribs 101b of an upper disk 100A in a state where the disks 100 are stacked. This allows a gap to be formed between the disks 100A, 100B. Moreover, the release portion further expands the gap of the disks 100A, 100B. Accordingly, even if positioning accuracy in the vertical direction of separation claws (claw portions 164Ac, 164Bc of separator hooks 164A, 164B) is not so high, the separation claws can surely enter the gap between the disks 100A, 100B. The release portions 102 having the configurations shown in FIG. 45B, and especially in FIG. 45C expand toward the outer diameter side while maintaining the vertical gap dimension on the inner circumferential surface side, which can assure a larger entrance dimension even if the separation claws are thick. Accordingly, the separation claws are made difficult to be deformed, and a supporting state of the disk 100A can be made stable. Moreover, in the depressed portion 103 shown in FIG. 45D and the projected portion 104 shown in FIG. 45E, the upper and lower surfaces of the disk 100 have the same shape, so that they are effective to the disk 100 having storage layers in both sides.

Figure 45F:
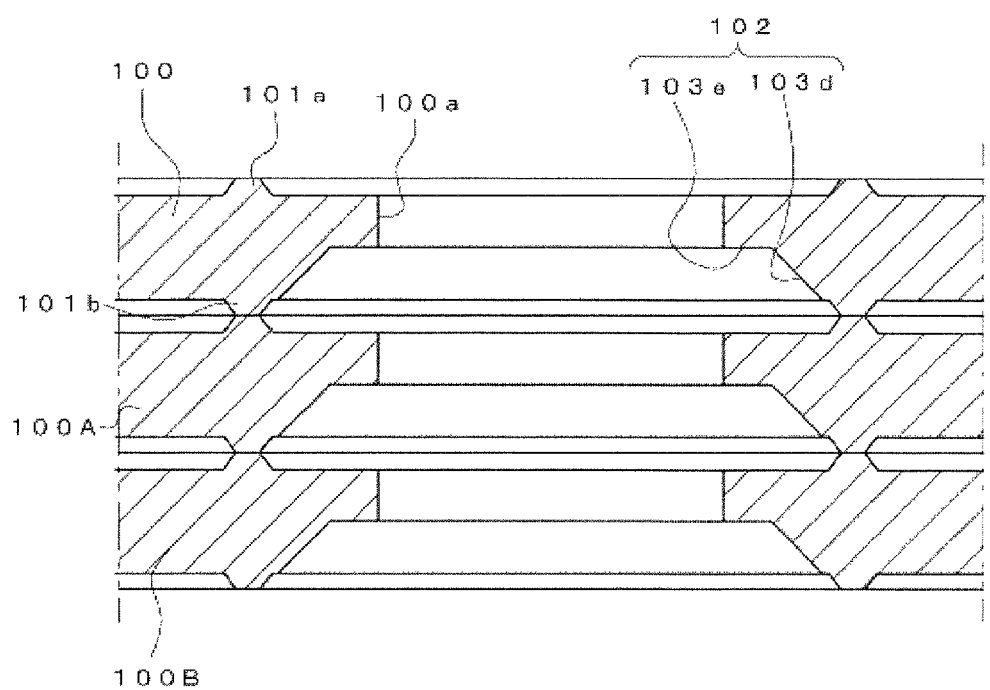
FIG. 45F is a cross-sectional view showing a disk formed with a release portion by a tapered surface and a horizontal surface in a lower-surface inner circumferential portion.

The release portion 102 is configured not only for avoiding interference with the separation claws in supporting the disk 100A located one higher but, for example, as shown in FIG. 45F, the release portion 102 can be configured as a space for supporting the disk 100 itself by forming the release portion 102 in the lower-surface inner circumferential portion of the disk 100, which release portion 102 is configured so that a horizontal surface 103e extends on the inner diameter side from the middle of a tapered surface 103d having a similar configuration to that shown in FIG. 45B.

In both corner portions located on a front side of the case 22 when the magazine tray 21 is contained inside the case 22, cutout portions 21c, 21c are formed. Inside of the cutout portions 21c, 21c in a width direction of the magazine tray 21, engagement depressed portions 21d, 21d with which a pair of hooks 35, 35 described later is engaged are formed.

In the magazine tray 21, a core rod 23 that is inserted into the central hole 100a provided in each of the plurality of disks 100 to restrict movement of each of the disks 100 in a surface direction. This core rod 23 prevents the disk 100 from being damaged due to the movement of the disk 100 in the surface direction. The core rod 23 is provided with an engagement portion 23a with which a spindle head 166b of a disk chuck unit 162 described later is engaged.

In the vicinity of the core rod 23, at least one or more holes 21e into which one or more lift pins 52a of the lifter 5 described later are inserted are provided. In the present embodiment, the three holes 21e are provided at intervals of 120 degrees. Moreover, the three holes 21e are provided at positions opposed to a non-recording/reproduction area of the inner circumferential portion of the disk 100 when the core rod 23 is inserted into the disk 100.

Figure 3:
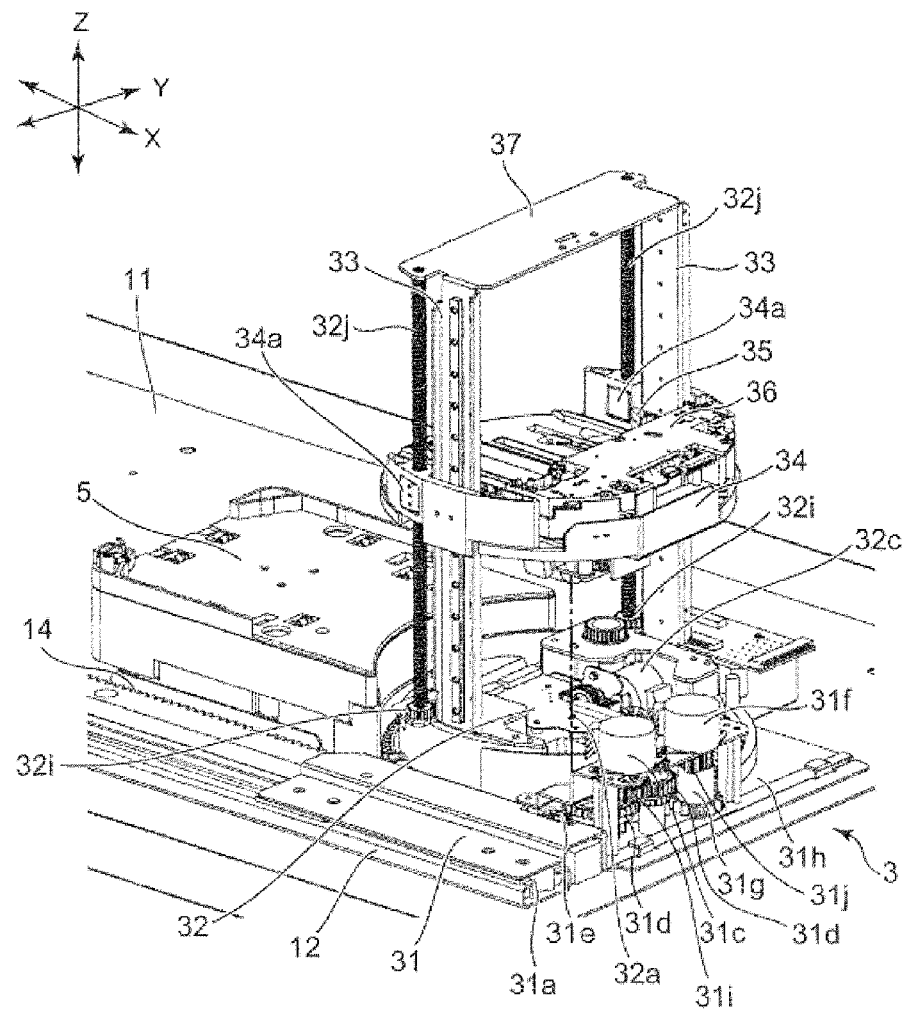
FIG. 3 is a perspective view of a picker that the disk device in FIG. 1 includes.
Figure 4:
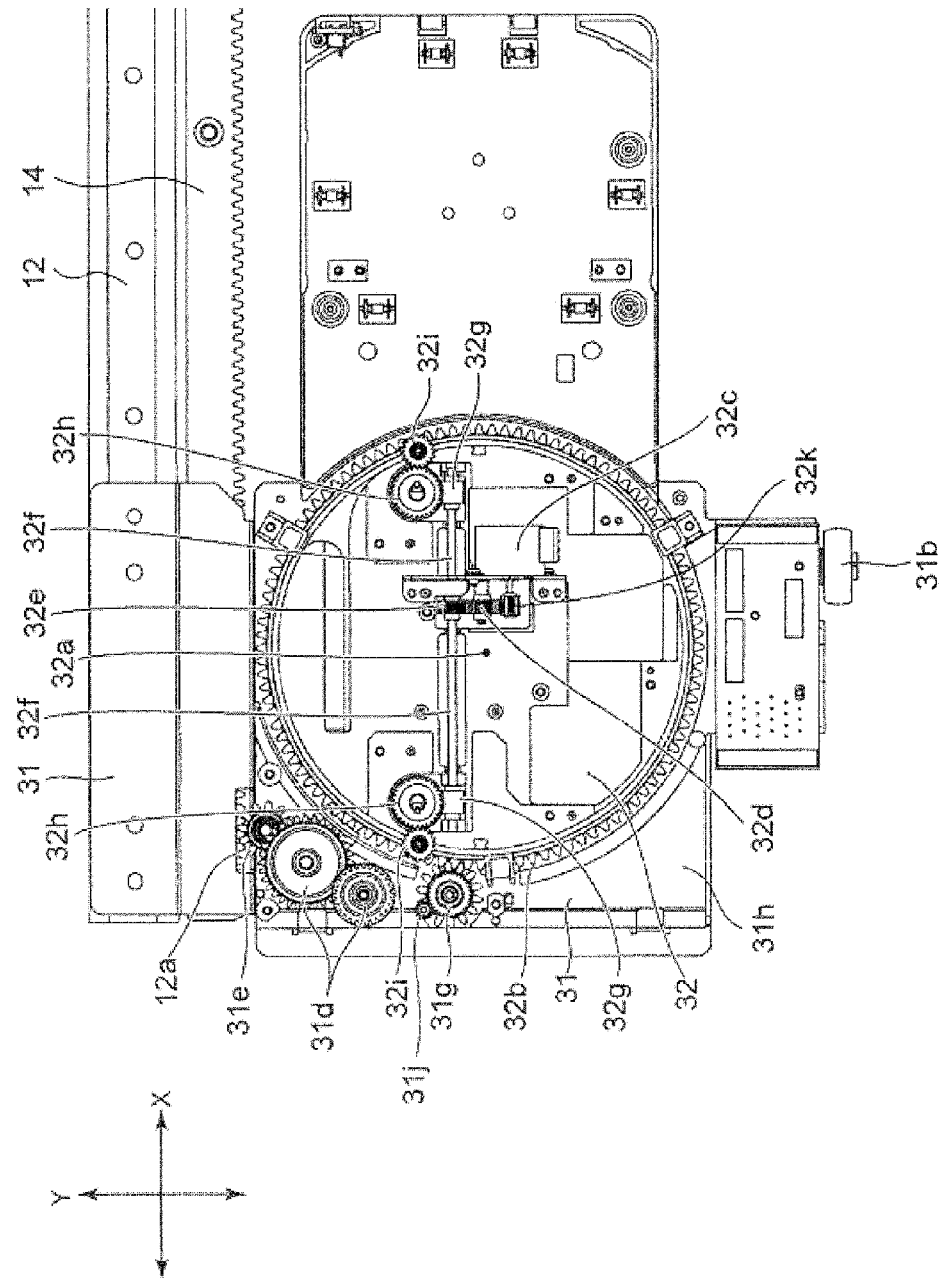
FIG. 4 is a plan view showing a configuration of a driving system of a lift base that the picker in FIG. 3 includes.

The picker 3 includes a traveling base 31. A dolly 31a moving slidably in the guide rail 12 is attached to the traveling base 31 on a side of one of the magazine stockers 1, as shown in FIG. 3. Moreover, a roller 31b is attached to the traveling base 31 on a side of the other magazine stocker 1, as shown in FIG. 4.

The traveling base 31 is provided with a picker motor 31c that generates driving force to move the picker 3 in the device depth direction X, as shown in FIG. 3. A speed reduction gear 31d is engaged with a motor gear 31i pressed into a driving shaft of the picker motor 31c. The speed reduction gear 31d is engaged with a pinion gear 31e. The pinion gear 31e is engaged with a rack 14 provided adjacent to the guide rail 12 so as to extend in the device depth direction X.

When the picker motor 31c is driven, the driving force of the picker motor 31c is transmitted to the pinion gear 31e through the motor gear 31i and the speed reduction gear 31d to rotate the pinion gear 31e. Here, the rack 14 is fixed to the bottom chassis 11. On the other hand, the traveling base 31 is not fixed to the bottom chassis 11. Therefore, when the pinion gear 31e rotates, the pinion gear 31e moves along the rack 14, so that the picker 3 moves in the device depth direction X.

As the picker motor 31c, for example, a stepping motor is used. A predetermined pulse is applied to the picker motor 31c, which can move the picker 3 to a front of the predetermined magazine 2.

A picker base 31h formed of resin is attached to the traveling base 31 formed of a metal plate. In the picker base 31h, a rotating base 32 is provided rotatably substantially around a rotary shaft 32a extending in the device height direction Z. Moreover, in the picker base 31h, a rotating base motor 31f that generates driving force to rotate the rotating base 32 is provided. A speed reduction gear 31g is engaged with a motor gear 31j pressed into a driving shaft of the rotating base motor 31f, as shown in FIG. 4. The speed reduction gear 31g is engaged with a rotating base gear 32b provided in an outer circumferential portion of the rotating base 32. When the rotating base motor 31f is driven, driving force of the rotating base motor 31f is transmitted to the rotating base gear 32b through the motor gear 31j and the speed reduction gear 31g to rotate the rotating base 32.

In the rotating base 32, a pair of lift rails 33, 33 is provided so as to extend in the device height direction Z and be opposed to each other. A lift base 34 is provided between the pair of lift rails 33, 33. Moreover, in the rotating base 32, a lift base motor 32c that generates driving force to move up and down the lift base 34 is provided.

A relay gear 32d is engaged with a motor gear 32k pressed into a driving shaft of the lift base motor 32c, as shown in FIG. 4. A coupling shaft gear 32e is engaged with the relay gear 32d. A coupling shaft 32f penetrates a central portion of the coupling shaft gear 32e. Worms 32g, 32g are fixed to both end portions of the coupling shaft 32f. Each of the worms 32g is engaged with a relay gear 32h. Each of the relay gears 32h is engaged with a lead screw gear 32i. Each of the lead screw gears 32i is fixed to a lead screw 32j. The respective lead screws 32j are provided so as to extend along the lift rails 33 in the device height direction Z. A nut 34a provided in the lift base 34 is screwed into each of the lead screws 32j, as shown in FIG. 3.

When the lift base motor 32c is driven, the driving force of the lift base motor 32c is transmitted to the lead screws 32j through the motor gear 32k, the relay gear 32d, the coupling shaft gear 32e, the coupling shaft 32f, the worms 32g, the relay gears 32h, the lead screw gears 32i to rotate the lead screws 32j. This moves up and down the lift base 34 in the device height direction Z along the pair of lift rails 33, 33.

Figure 8:
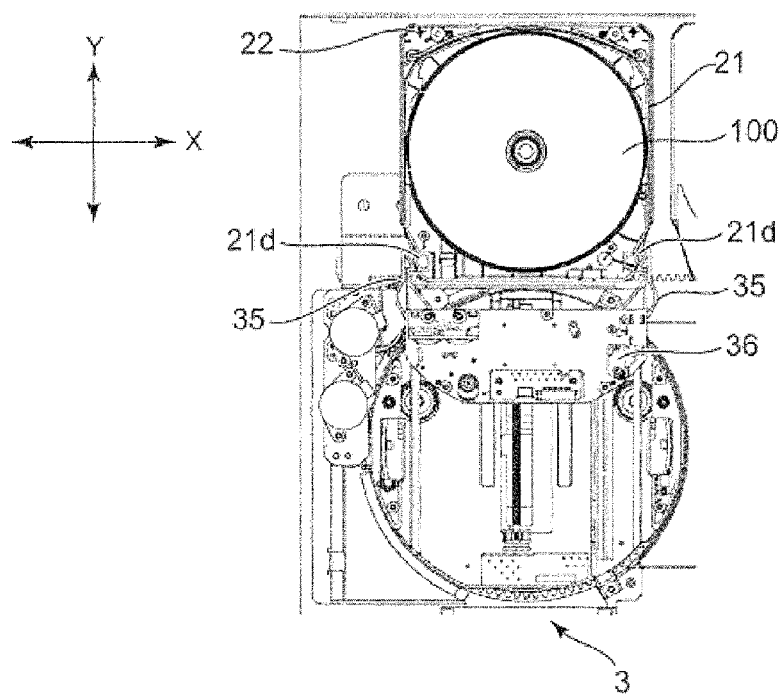
FIG. 8 is a plan view showing how the picker in FIG. 3 brings out a magazine tray from the magazine.

In the lift base 34, as shown in FIG. 8, the pair of hooks 35, 35 that can be engaged with the engagement depressed portions 21d of the magazine tray 21, and a chuck 36 having a mechanism that performs closing/opening operation of the pair of hooks 35, 35 and moving forth and back are provided.

Figure 5:
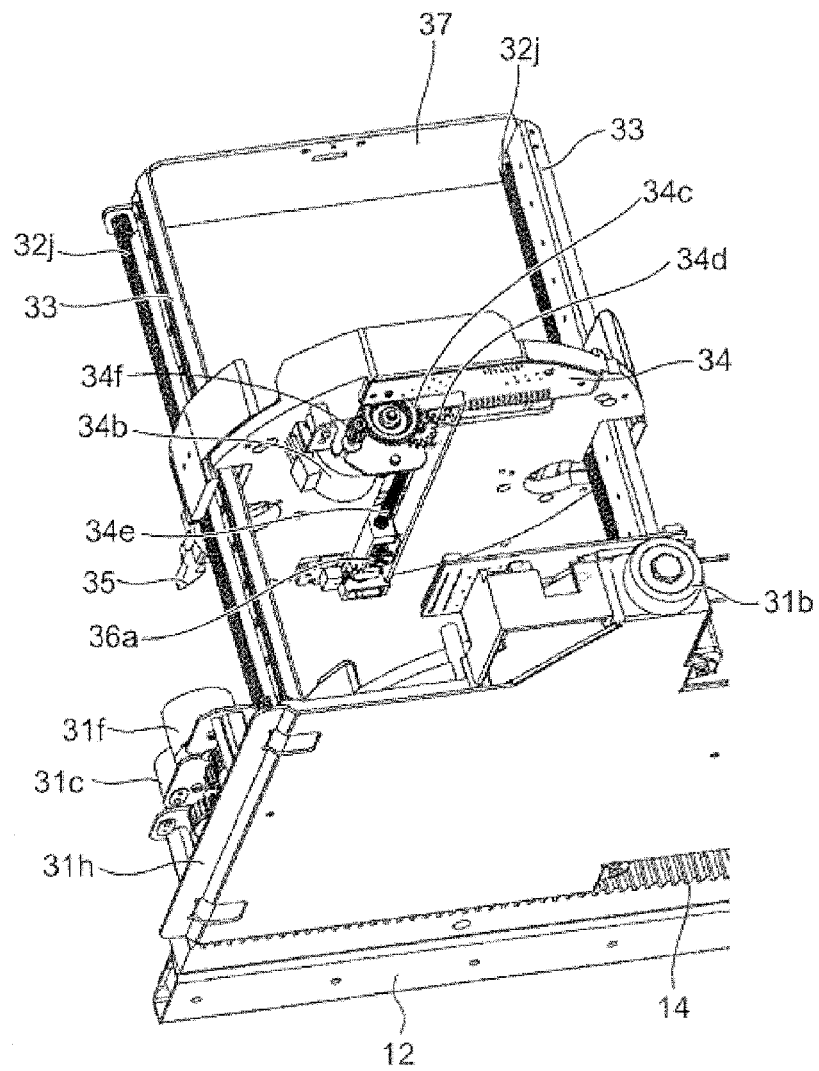
FIG. 5 is a perspective view when the picker in FIG. 3 is viewed from an obliquely lower side.

Moreover, in the lift base 34, as shown in FIG. 5, a chuck motor 34b is provided. A speed reduction gear 34c is engaged with a motor gear 34f pressed into a driving shaft of the chuck motor 34b. The speed reduction gear 34c is engaged with a lead screw gear 34d. The lead screw gear 34d is fixed to a lead screw 34e. The lead screw 34e is provided so as to extend in a direction perpendicular to a straight line connecting the pair of lift rails 33, 33. The lead screw 34e is screwed into a nut 36a fixed to the chuck 36.

When the chuck motor 34b is driven, driving force of the chuck motor 34b is transmitted to the nut 36a through the motor gear 34f, the speed reduction gear 34c, the lead screw gear 34d, and the lead screw 34e, and the chuck 36 moves along the lead screw 34e.

Moreover, the chuck 36 is configured so that a distance between the pair of hooks 35, 35 can be adjusted. The chuck 36 reduces the distance between the pair of hooks 35, 35, which allows the pair of hooks 35, 35 to be engaged with the engagement depressed portions 21d, 21d of the magazine tray 21. On the other hand, the chuck 36 increases the distance between the pair of hooks 35, 35, which can release the engagement state between the pair of hooks 35, 35, and the engagement depressed portions 21d, 21d of the magazine tray 21.

The pair of lift rails 33 is attached to both side surfaces of a U-shaped angle 37. Upper end portions of the pair of lead screws 32j are rotatably attached to an upper surface of the angle 37.

The picker motor 31c, the rotating base motor 31f, the lift base motor 32c, and the chuck motor 34b are connected to the controller of the electric circuit and the power supply 7 through an FFC (Flexible Flat Cable) 114 (refer to FIG. 1) so that the driving thereof is controlled by the controller.

Figure 6:
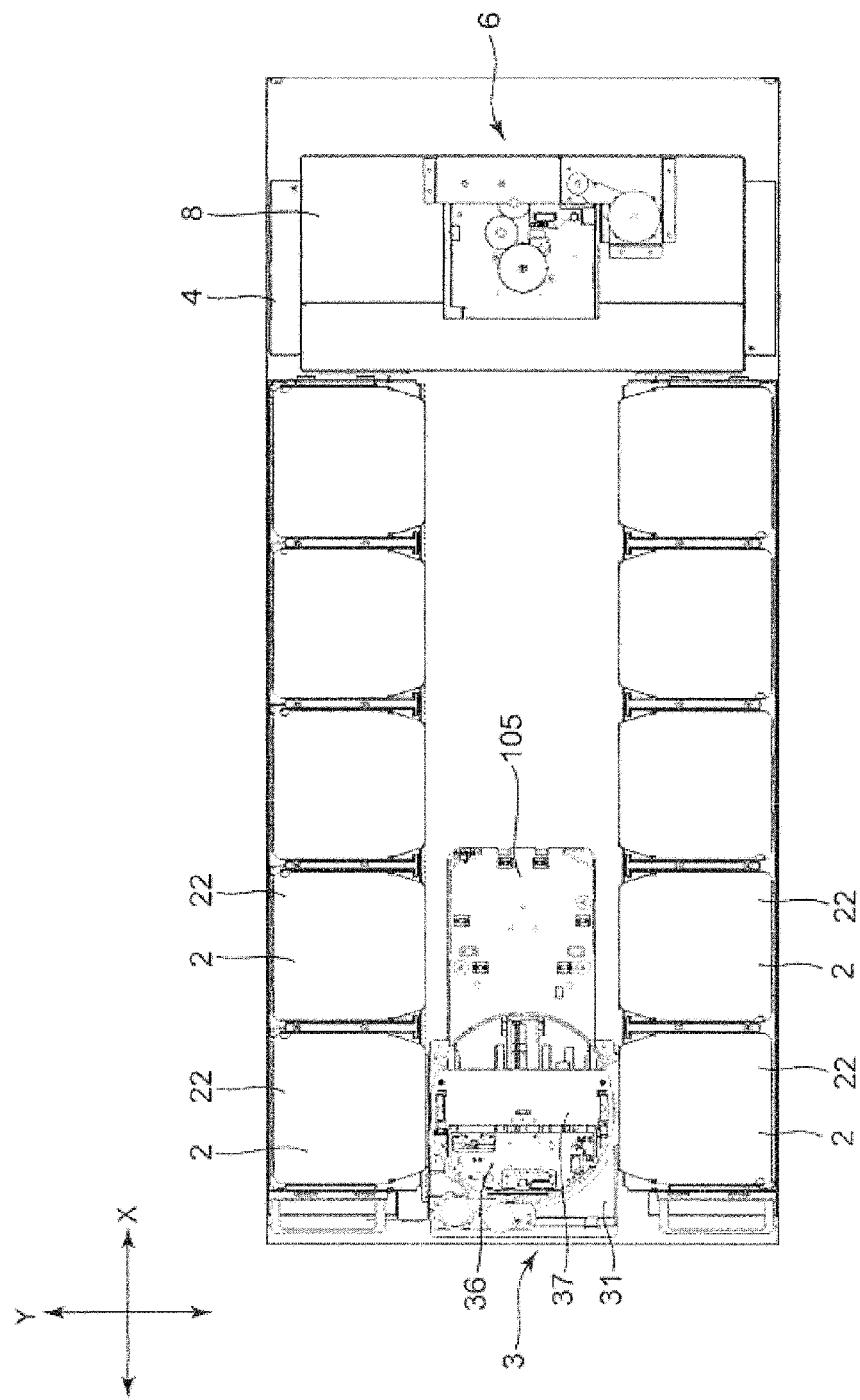
FIG. 6 is a plan view showing a state where the picker in FIG. 3 has moved to a front of a magazine selected from a plurality of magazines.
Figure 7:
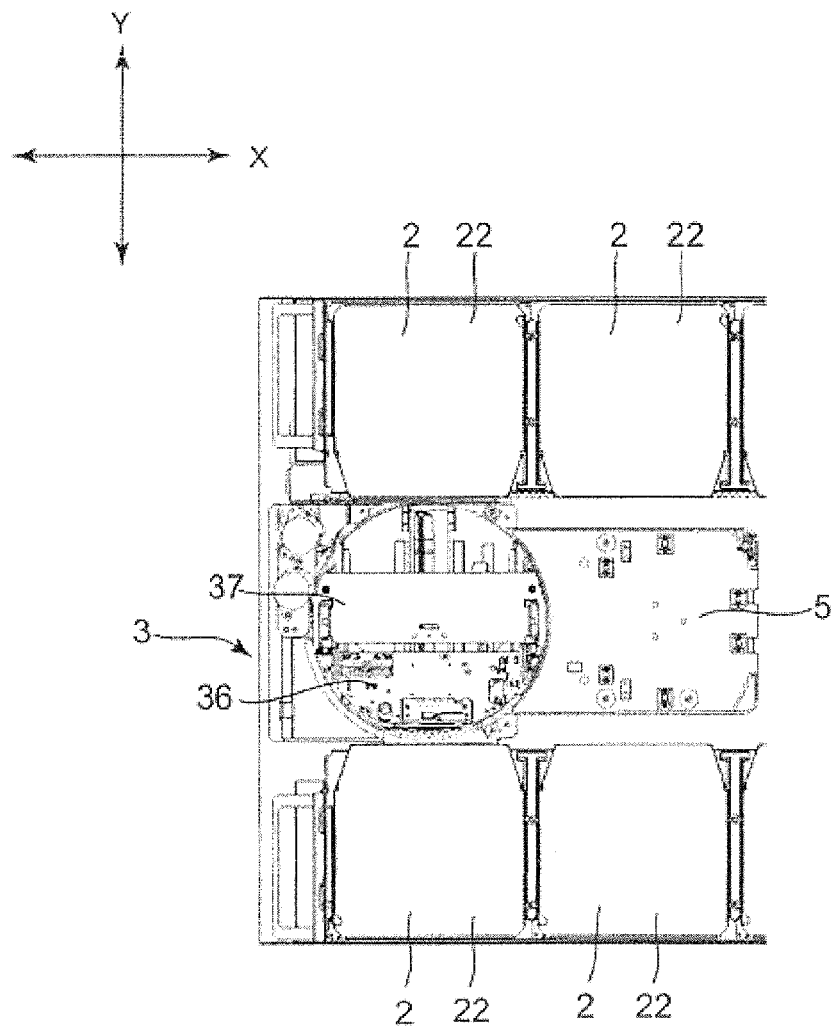
FIG. 7 is a plan view showing how the picker in FIG. 3 brings out a magazine tray from the magazine.

FIGS. 6 to 12 show how the picker 3 brings out the magazine tray 21 from the case 22. The traveling base 31 travels in the device depth direction X, and the lift base 34 moves up and down along the pair of lift rails 33 in the device height direction Z, by which the picker 3 is moved to the front of the one magazine 2 selected from the plurality of the magazines 2, as shown in FIG. 6. Moreover, as shown in FIG. 7, the rotating base 32 is rotated so that the chuck 36 faces the front of the magazine 2.

Figure 9:
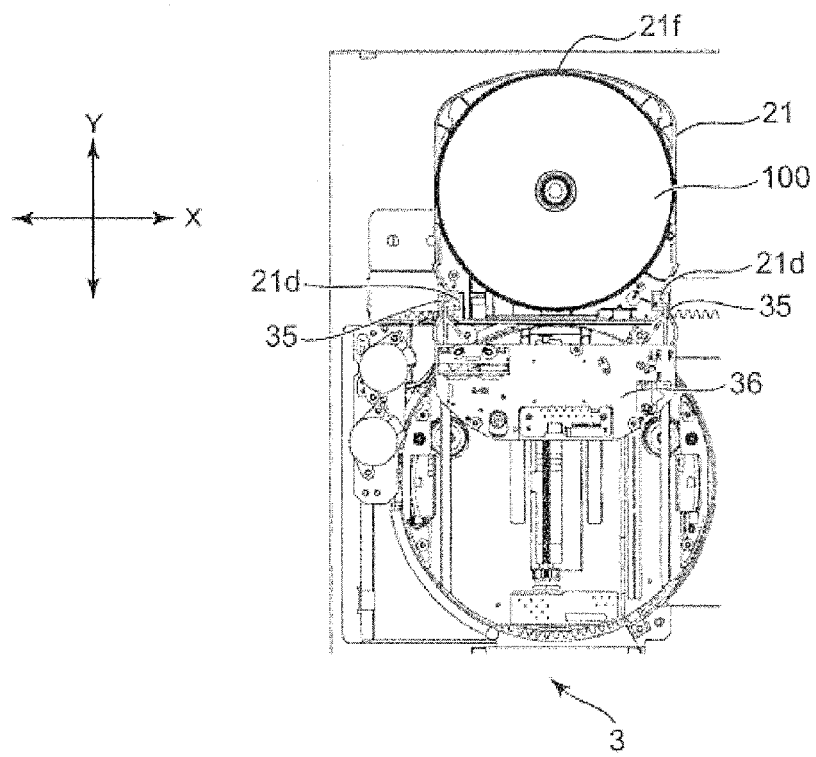
FIG. 9 is a plan view showing how the picker in FIG. 3 brings out a magazine tray from the magazine.

Thereafter, as shown in FIG. 8, the chuck 36 advances to the magazine tray 21 to engage the pair of hooks 35, 35 with the engagement depressed portions 21d, 21d of the magazine tray 21 as shown in FIG. 9. In this state, the chuck 36 withdraws from the case 22 to thereby bring out the magazine tray 21 from the case 22.

Figure 10:
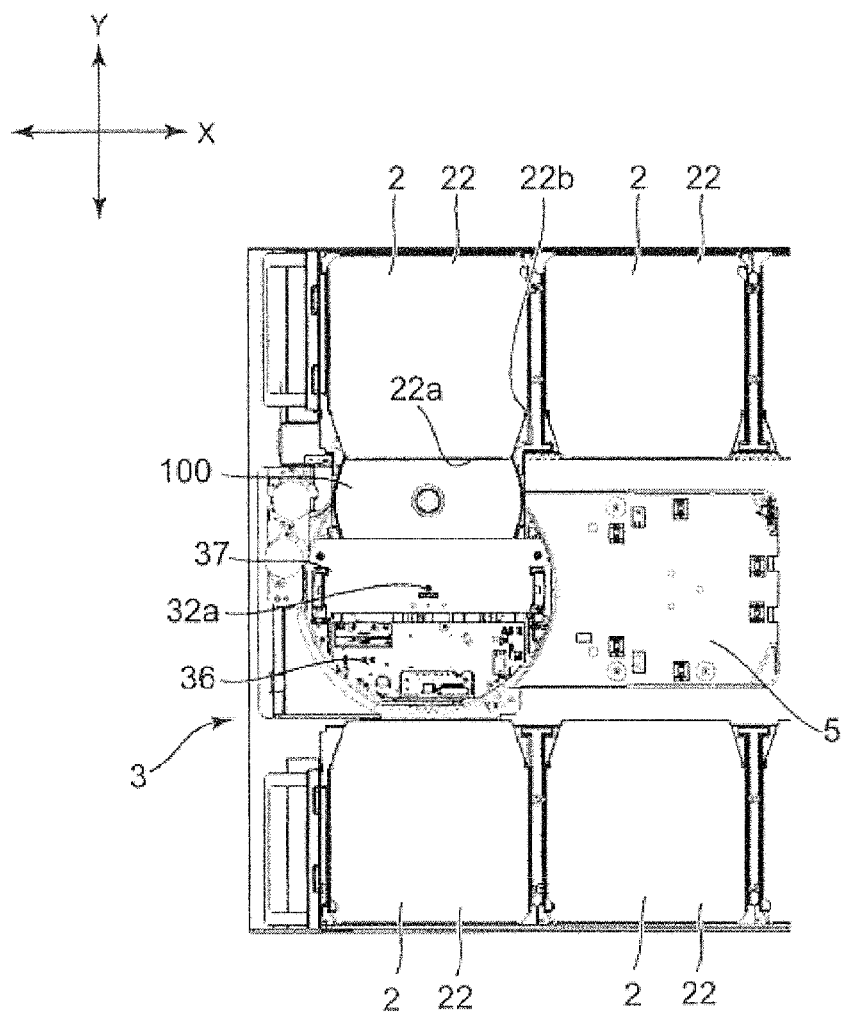
FIG. 10 is a plan view showing how the picker in FIG. 3 brings out a magazine tray from the magazine.
Figure 11:
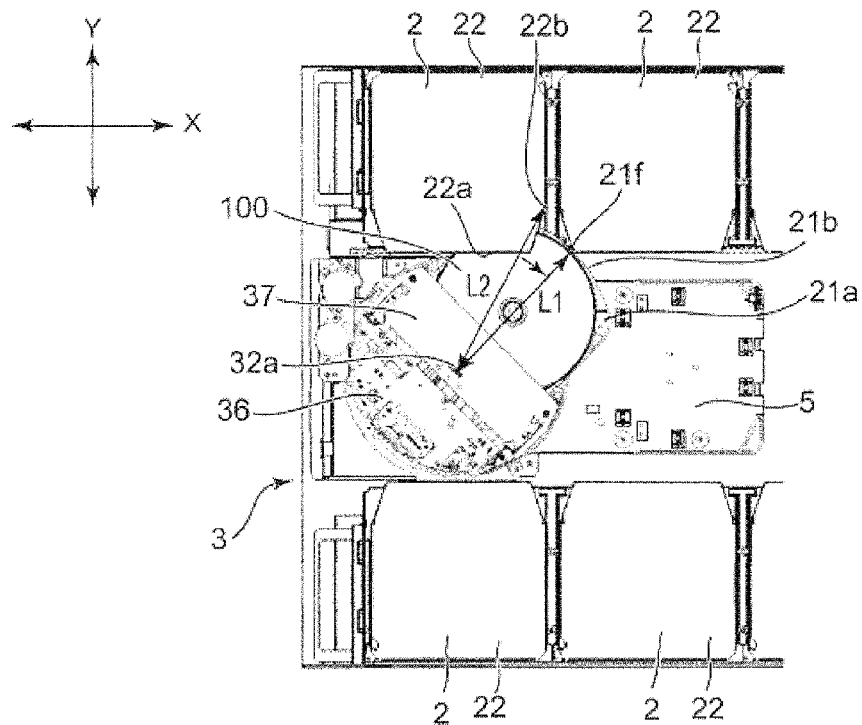
FIG. 11 is a plan view showing how the picker in FIG. 3 brings out a magazine tray from the magazine.
Figure 12:
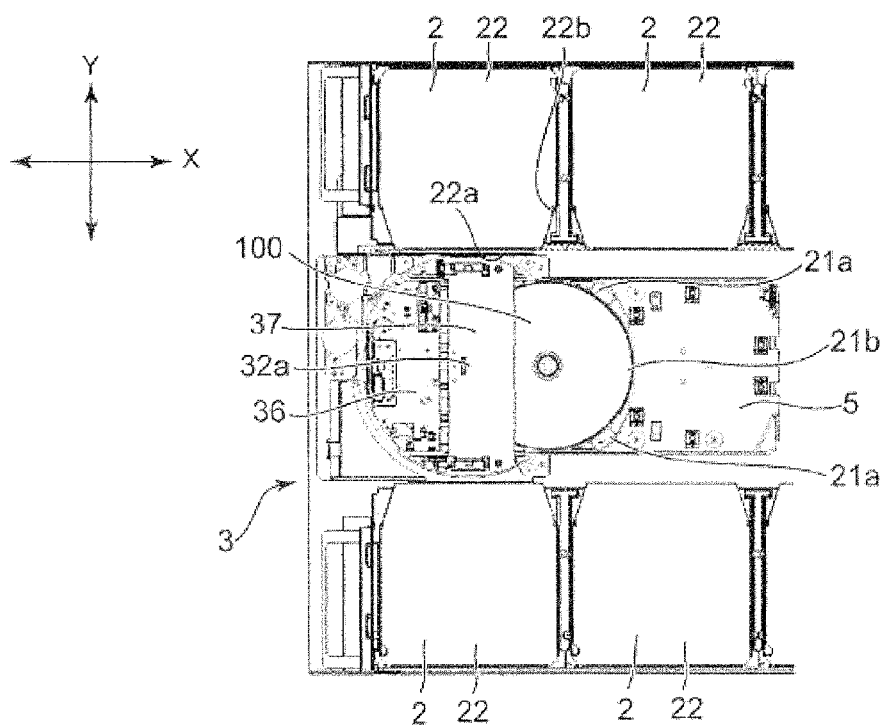
FIG. 12 is a plan view showing a state where the picker in FIG. 3 has brought out the magazine tray from the magazine.

As shown in FIG. 10, by the withdrawal of the chuck 36 (moving to the front of the case 22), the cut portions 21a of the magazine tray 21 pass through the opening portion 22a of the case 22, and then, the rotating base 32 is rotated clockwise substantially around the rotary shaft 32a. In other words, as shown in FIG. 11, when a length L1 from a top 21f of the side surface 21b of the magazine tray 21 (a position where the length from the rotary shaft 32a is largest) to the rotary shaft 32a becomes smaller than a length L2 from a front end portion 22b of a side surface of the case 22 to the rotary shaft 32a, the rotating base 32 is rotated clockwise substantially around the rotary shaft 32a. With this rotation of the rotating base 32, the magazine tray 21 rotates substantially around the rotary shaft 32a, as shown in FIGS. 11 and 12. As a result, as shown in FIG. 12, the magazine tray 21 is completely brought out from the case 22.

Figure 13:
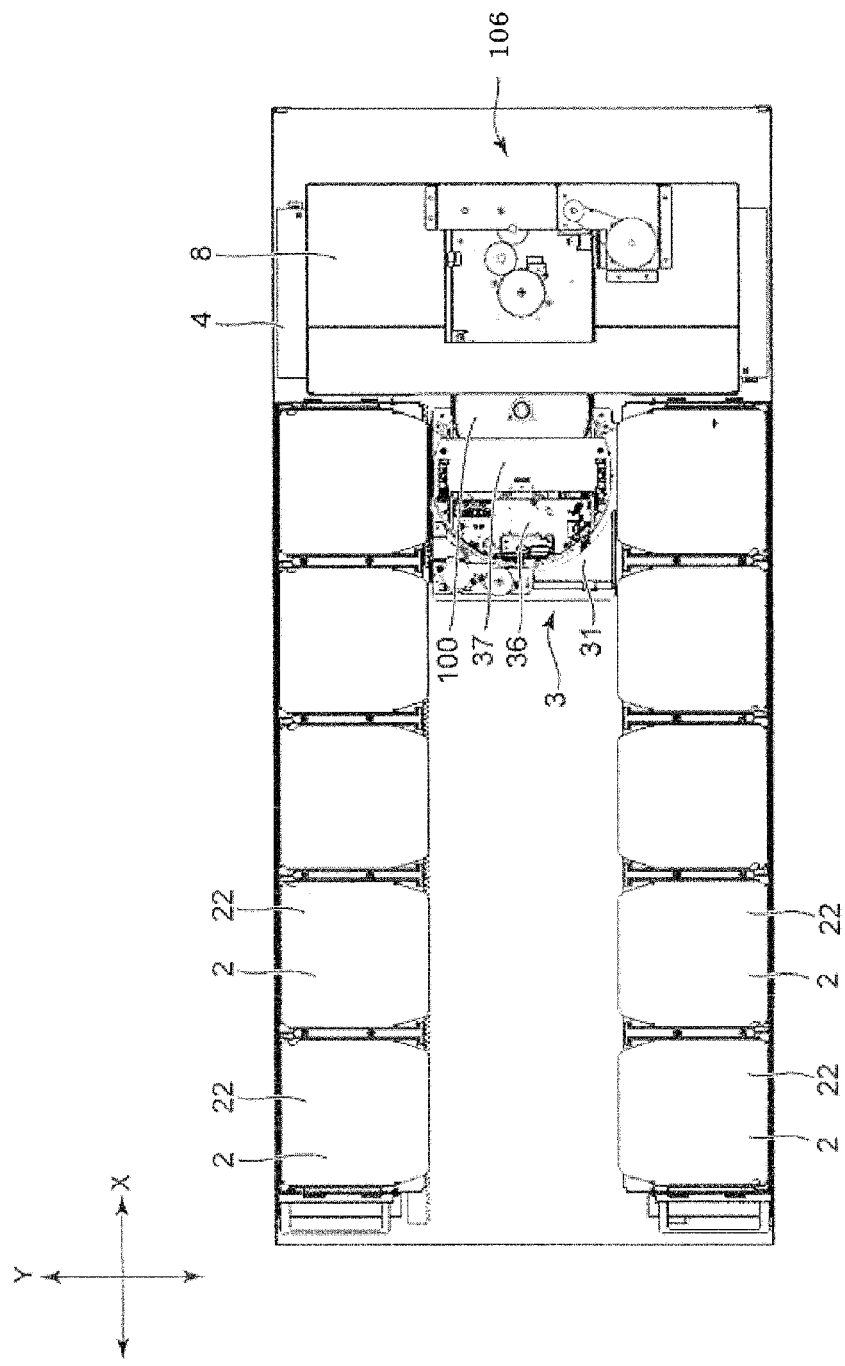
FIG. 13 is a plan view showing a state where the picker in FIG. 3 has conveyed the magazine tray to a vicinity of a plurality of disk drives.
Figure 14:
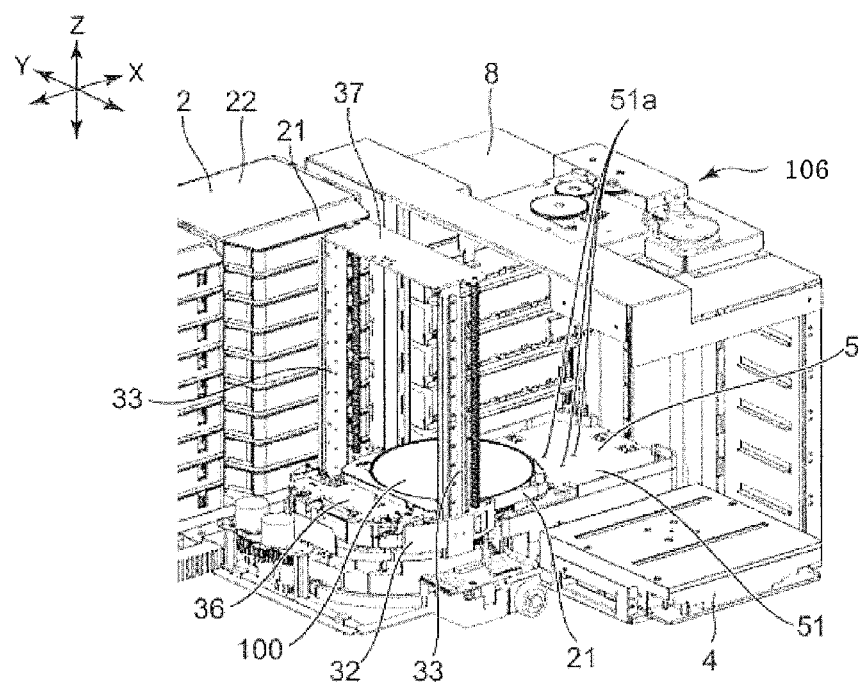
FIG. 14 is a perspective view showing the state where the picker in FIG. 3 has conveyed the magazine tray to the vicinity of the plurality of disk drives.
Figure 15:
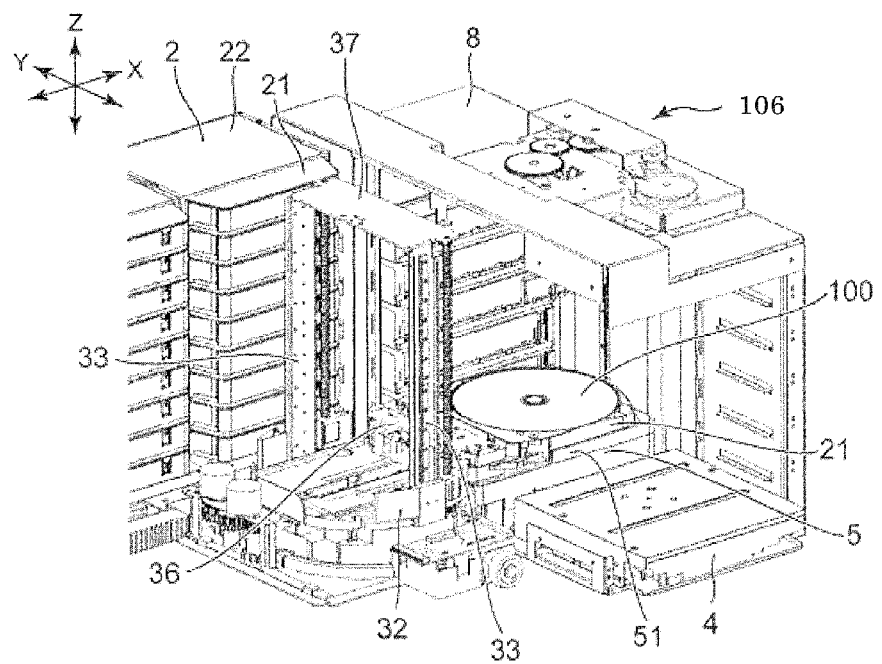
FIG. 15 is a perspective view showing a state where the magazine tray is moved by the picker in FIG. 3, above a lifter that the disk device in FIG. 1 includes.

As shown in FIG. 12, the magazine tray 21 brought out from the case 22 is conveyed to the vicinity of the plurality of disk drives 4 as shown in FIGS. 13 and 14 by the traveling base 31 of the picker 3 traveling to the device back side. Thereafter, as shown in FIG. 15, the chuck 36 of the picker 3 advances to place the magazine tray 21 at a predetermined position on a magazine tray guide 51 in an upper portion of the lifter 5. In FIGS. 14 and 15, illustration of the disk drives 4 on the front side on paper is omitted.

Figure 16:
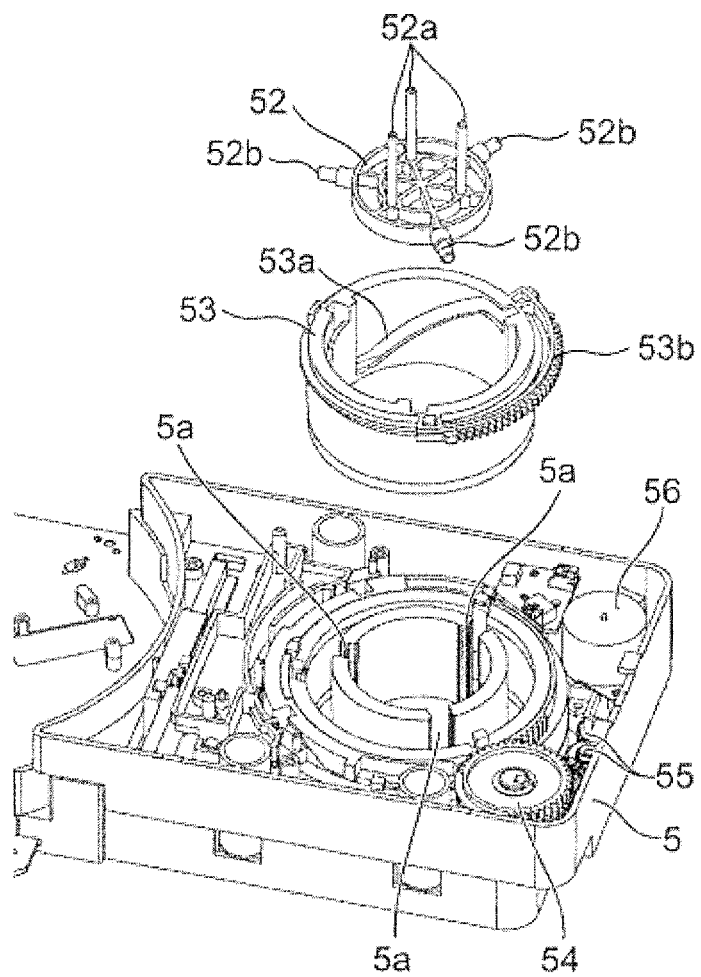
FIG. 16 is an exploded perspective view showing a state where a magazine tray guide of the lifter that the disk device in FIG. 1 includes is detached.
Figure 17:
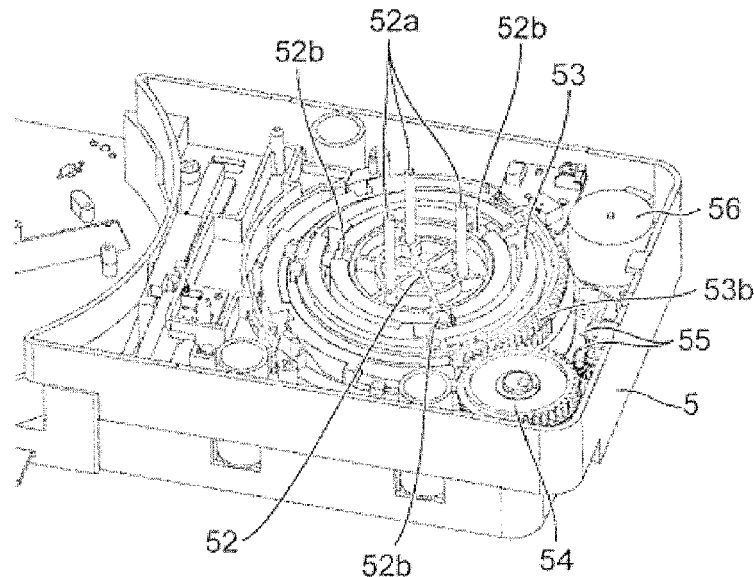
FIG. 17 is an assembly perspective view showing the state where the magazine tray guide of the lifter that the disk device in FIG. 1 includes is detached.

FIG. 16 is an exploded perspective view showing a state where the magazine tray guide 51 of the lifter 5 is detached, and FIG. 17 is an assembly perspective view.

As shown in FIGS. 16 and 17, the lifter 5 includes a lift plate 52, a rotating cam 53, a driving gear 54, a relay gear 55, and a lifter motor 56.

The lift plate 52 includes the lift pins 52a as one example of rod-shaped members, and cam pins 52b. In the present embodiment, the three lift pins 52a and the three cam pins 52b are provided at intervals of 120 degrees, respectively.

As shown in FIG. 15, the three lift pins 52a are provided at positions matching the three holes 21e provided in the magazine tray 21 as shown in FIG. 2B when the magazine tray 21 is placed at the predetermined position of the magazine tray guide 51. Moreover, as shown in FIG. 14, in the magazine tray guide 51, three holes 51a are provided at positions corresponding to the three lift pins 52a. The three cam pins 52b are engaged with three slits 5a provided in a body of the lifter 5. The respective slits 5a are provided so as to extend in the device height direction Z.

In an inner circumferential surface of the rotating cam 53, there are provided three cam grooves 53a having inclined surfaces on which forefronts of the three cam pins 52b slide. In an outer circumferential surface of the rotating cam 53, a cam gear 53b is provided. The cam gear 53b is engaged with the driving gear 54. The driving gear 54 is engaged with the relay gear 55. The relay gear 55 is engaged with a motor gear (not shown) pressed into a driving shaft of the lifter motor 56.

When the lifter motor 56 is driven, driving force of the lifter motor 56 is transmitted to the driving gear 54 through the motor gear (not shown) and the relay gear 55 to rotate the driving gear 54. Thereby, the driving gear 54 is engaged with the cam gear 53b, and the rotating cam 53 rotates. When the rotating cam 53 is rotated, the forefront portions of the three cam pins 52b whose rotation is restricted by the three slits 5a slide on the inclined surfaces of the three cam grooves 53a, so that the lift plate 52 moves up and down in the device height direction Z. The lift motor 56 is connected to the controller of the electric circuit and the power supply 7 through the FFC 14 (refer to FIG. 1), so that the driving is controlled by the controller.

As shown in FIG. 17, when the lift plate 52 moves up, the three lift pins 52a enters an inside of the magazine tray 21 through the three holes 51a of the magazine tray guide 51 and the three holes 21e of the magazine tray 21. This moving-up of the three lift pins 52a pushes out the plurality of disks 100 from the magazine tray 21. The plurality of disks 100 pushed out by the three lift pins 52a are held by the carrier 106.

Figure 18:
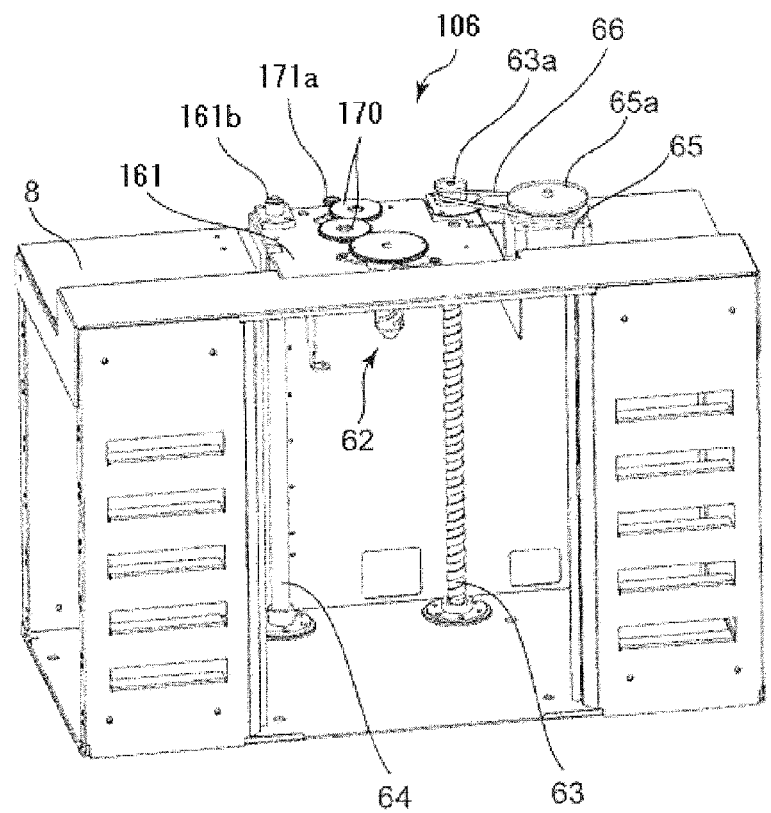
FIG. 18 is a perspective view of a carrier that the disk device in FIG. 1 includes.

The carrier 106 is provided in a housing 8 containing the plurality of (e.g., 12) disk drives 4, as shown in FIG. 18. The carrier 106 is configured so as to hold the plurality of disks pushed out from the lifter 5, separate one disk from the plurality of held disks above the tray 4a ejected from the arbitrary disk drive 4, and place the separated disk on the tray 4a.

Figure 19:
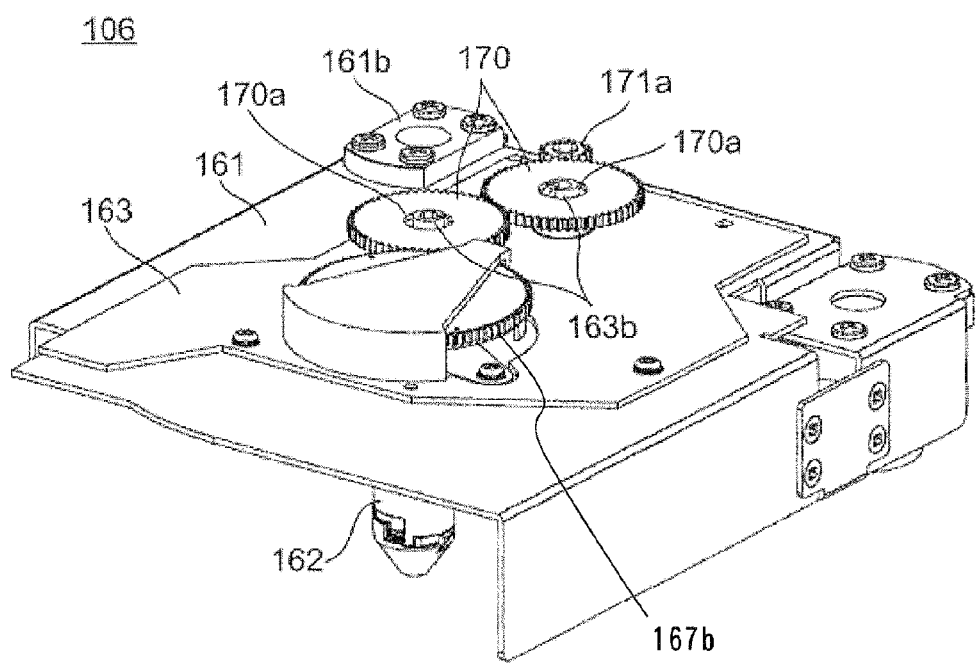
FIG. 19 is a perspective view when the carrier shown in FIG. 18 is viewed from an obliquely upper side.
Figure 20:
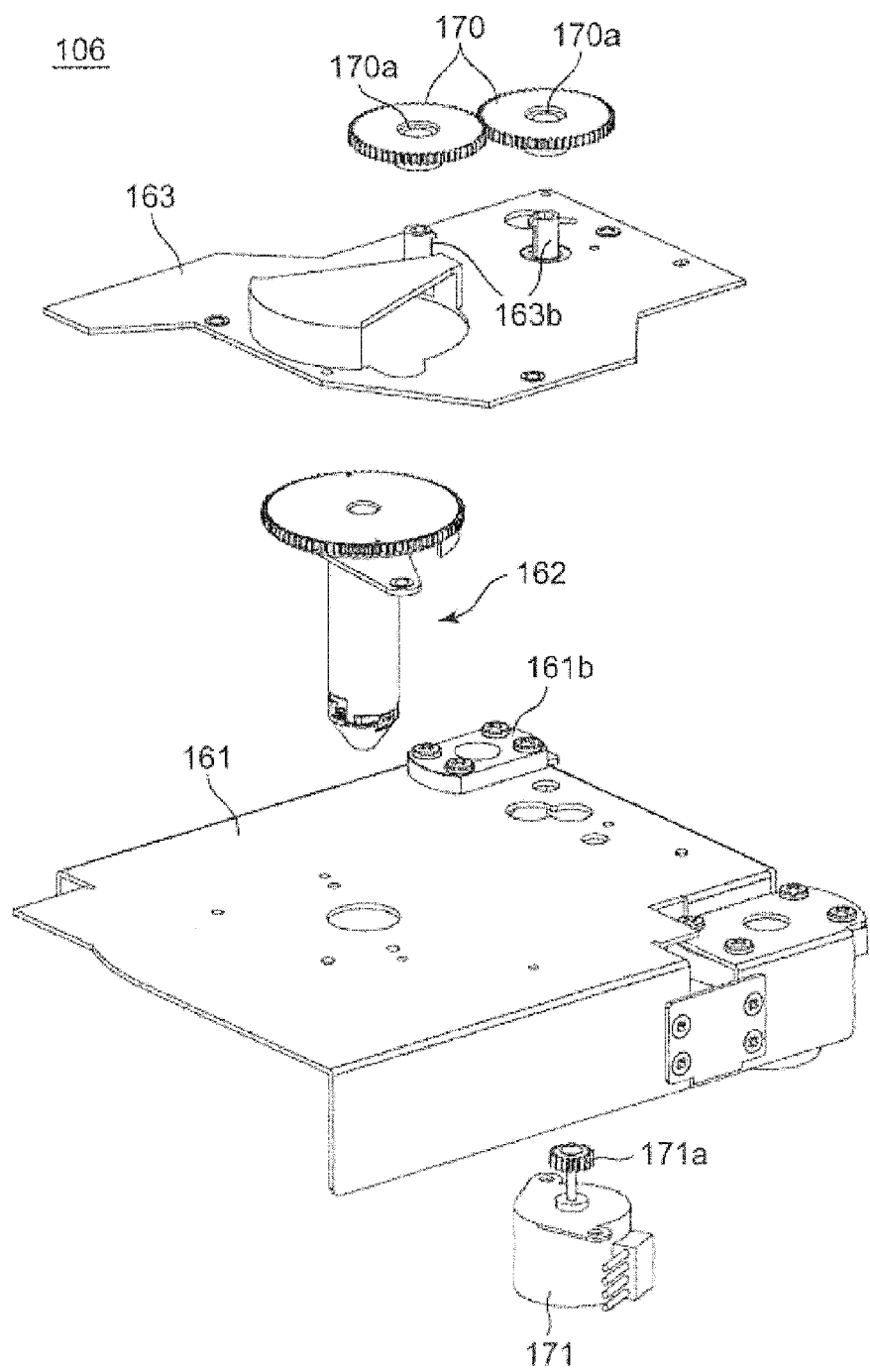
FIG. 20 is an exploded perspective view of the carrier in FIG. 19.

As shown in FIGS. 19 and 20, the carrier 106 includes a moving base 161 moving in the device height direction Z, and a disk chuck unit 162 provided in the moving base 161.

Figure 21:
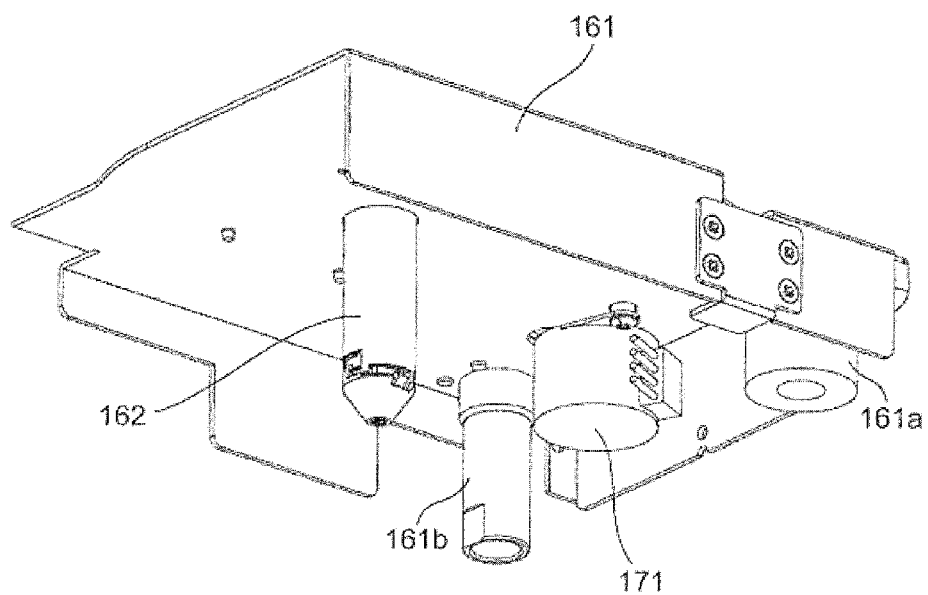
FIG. 21 is a perspective view when the carrier in FIG. 19 is viewed from an obliquely lower side.
Figure 22:
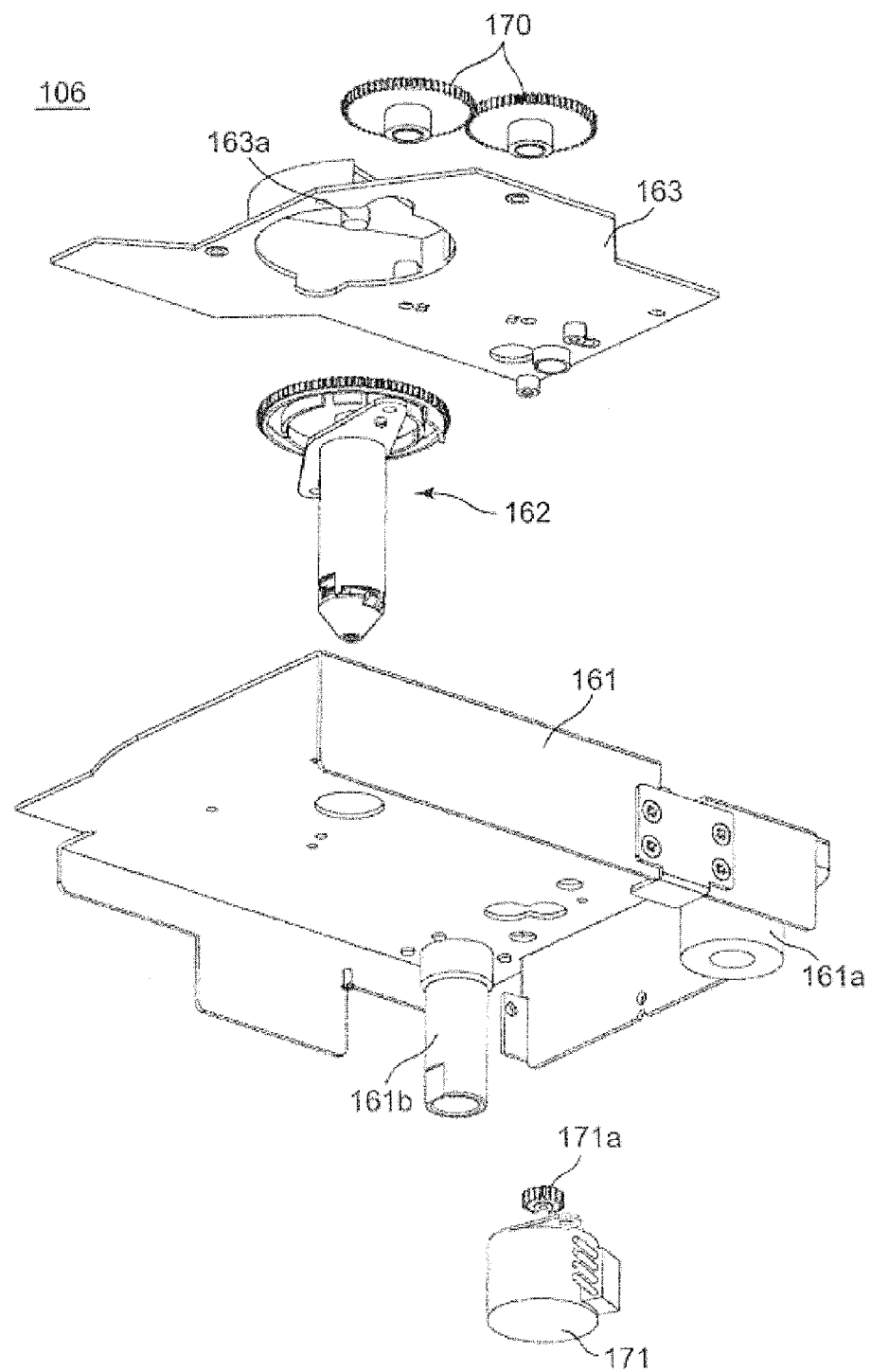
FIG. 22 is an exploded perspective view of the carrier in FIG. 21.

As shown as FIGS. 21 and 22, the moving base 161 includes a bush 161a connected to a ball screw 63 (refer to FIG. 18), and a guide bearing 161b connected to a guide shaft 64 (refer to FIG. 18). The carrier motor 65 is driven (refer to FIG. 18) to rotate the ball screw 63, by which the moving base 161 is guided by the ball screw 63 and the guide shaft 64 and moves in the device height direction Z. A gear plate 163 provided with revolving shafts or revolving bearings of various gears described later is attached to an upper surface of the moving base 161.

The disk chuck unit 162 is configured so as to hold the plurality of disks 100 pushed out by the lifter 5 and separate the plurality of held disks 100 one by one. Specifically, the disk chuck unit 162 includes separator hooks 164A, 164B, bottom hooks 165A, 165B, a spindle unit 166, and a cam shaft unit 167 as shown in FIGS. 23 and 24.

Figure 25:
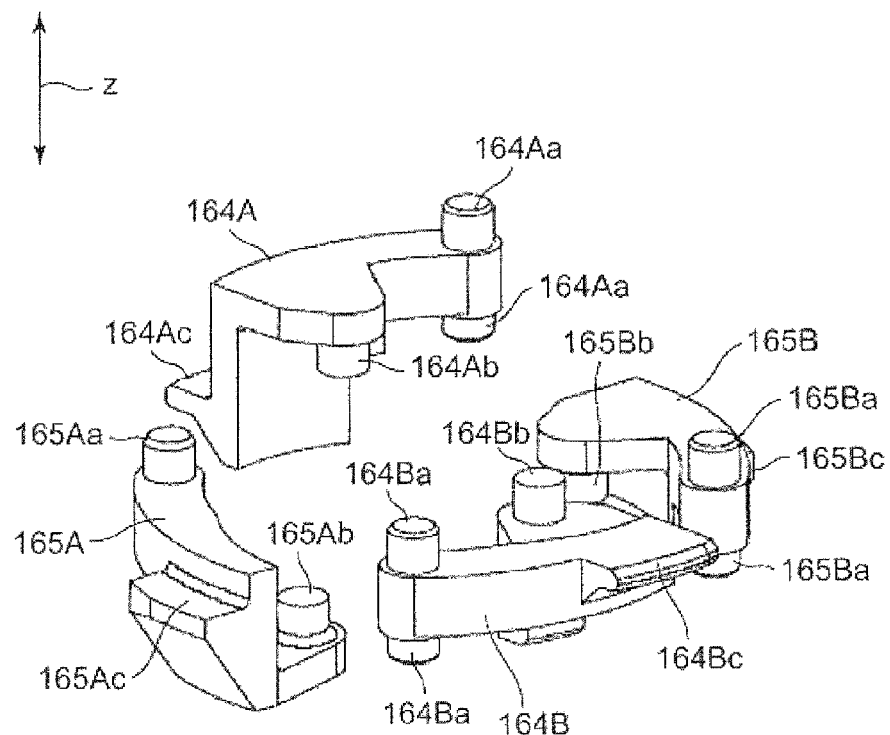
FIG. 25 is an enlarged perspective view of two separator hooks and two bottom hooks that the disk chuck unit in FIG. 23 includes.

FIG. 25 is an enlarged perspective view of the separator hooks 164A, 164B and the bottom hooks 165A, 165B. The hooks 164A to 165B are each formed into a substantially lever shape, and include revolving shafts 164Aa to 165Ba and driving pins 164Ab to 165Bb extending in the device height direction Z, and claw portions 164Ac to 165Bc projected in a direction crossing the device height direction Z.

Figure 24:
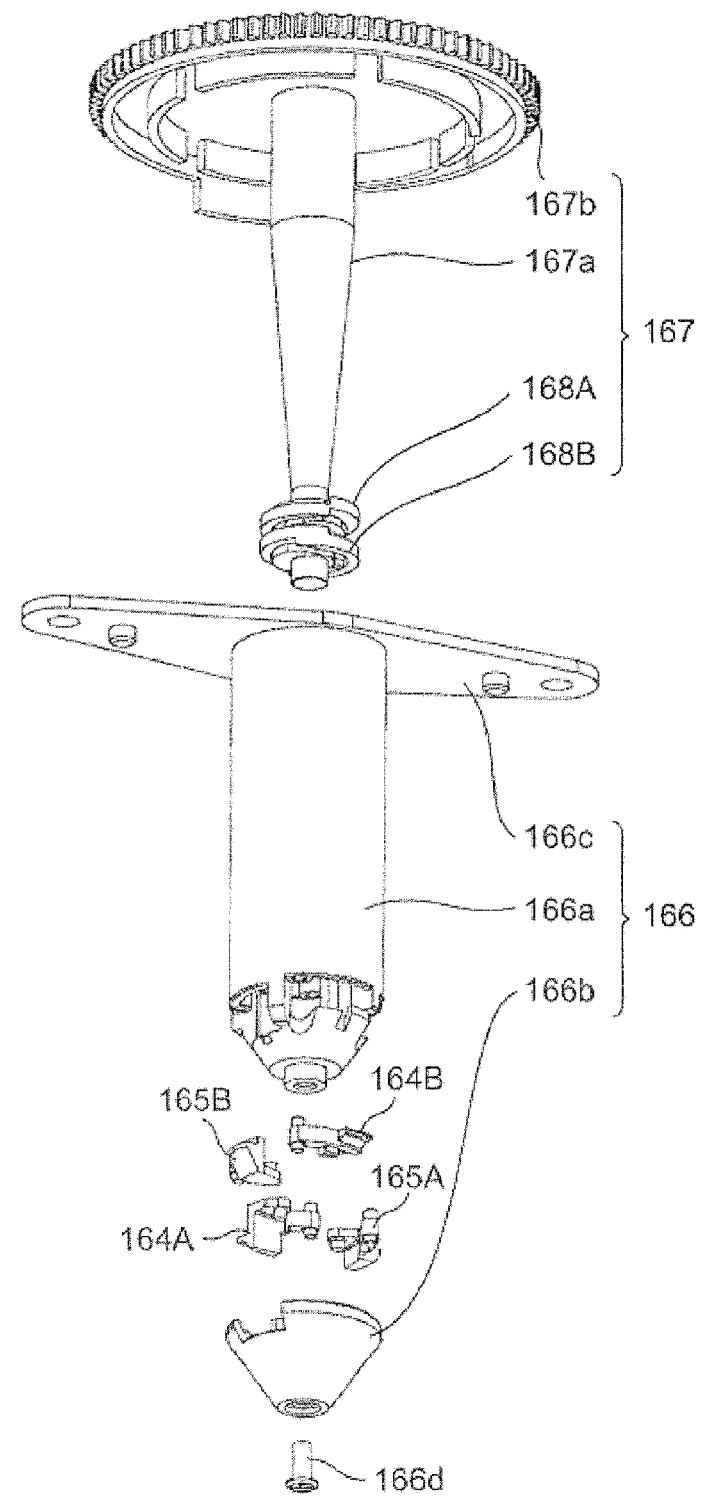
FIG. 24 is an exploded perspective view of the disk chuck unit that the carrier in FIG. 19 includes, and a view when the disk chuck unit is viewed from an obliquely lower side.

Moreover, in the present embodiment, in the inner circumferential portion of the disk 100, a depressed portion 100b is provided, as shown in FIG. 24. The depressed portion 100b is formed into a shape obtained by cutting an upper corner portion of the inner circumferential portion of the disk 100 so as to have a plane 100ba and an inclined surface 100bb. Lower surfaces of the claw portions 164Ac, 164Bc of the separator hooks 164A, 164B are each formed with an inclined surface so that a thickness increases downward from the outer circumferential side to the inner circumferential side, as shown in FIG. 25. Moreover, upper surfaces of the claw portions 164Ac to 165Bc are each formed perpendicularly to the device height direction Z.

Figure 23:
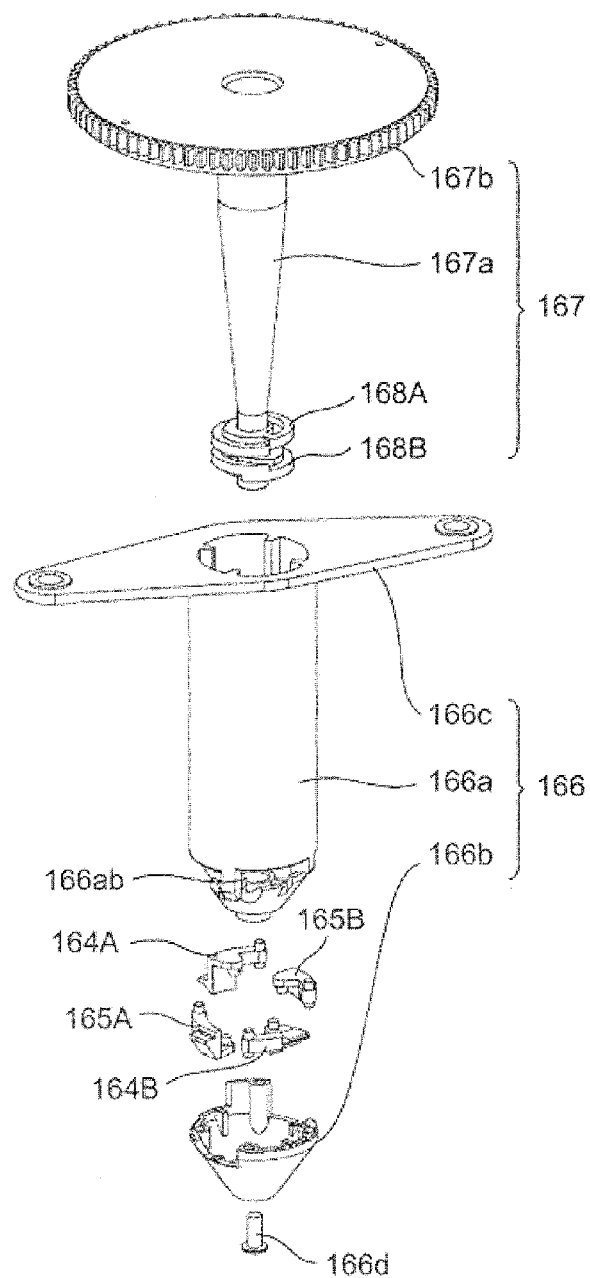
FIG. 23 is an exploded perspective view of a disk chuck unit that the carrier in FIG. 19 includes, and a view when the disk chuck unit is viewed from an obliquely upper side.

The spindle unit 166 includes a substantially cylindrical spindle shaft 166a, a substantially circular truncated cone-shaped spindle head 166b provided below the spindle shaft 166a, and a flange 166c provided in an upper end portion of the spindle shaft 166a, as shown in FIGS. 23 and 24.

The spindle unit 166 moves integrally with the moving base 161 by directly or indirectly attaching the flange 166c to the moving base 161. A diameter of the spindle shaft 166a is almost the same or slightly smaller than a diameter of the central hole 100a of the disk 100. Accordingly, the disk 100 is positioned radially with respect to the spindle shaft 166a in a state where the spindle shaft 166a is inserted into the central hole 100a of the disk 100. In the inner circumferential portion of the disk 100, the release portion 103 is formed, so that a range of the central hole 100a guided by the spindle shaft 166a is about half of a conventional range. This enables the spindle shaft 166a to be inserted effortlessly, even when the diameter of the spindle shaft 166a is almost the same as the diameter of the central hole 100a of the disk 100.

Figure 26:
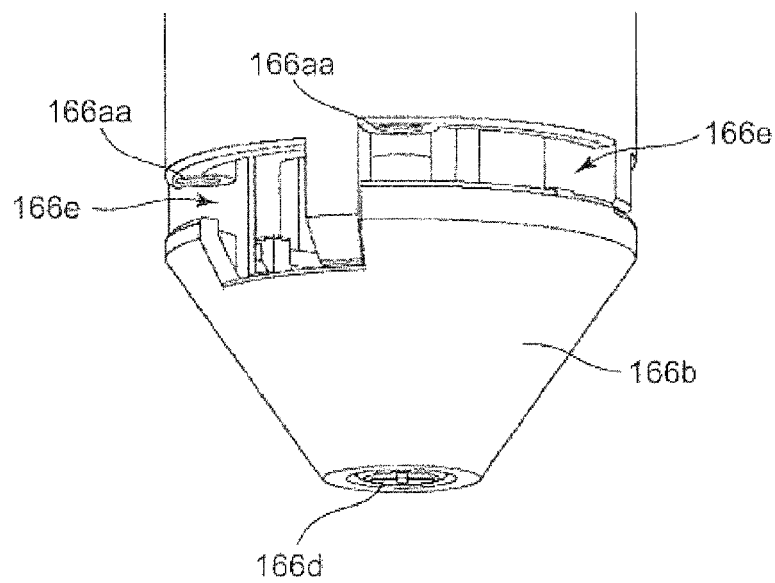
FIG. 26 is a perspective view showing a state where a spindle head that the disk chuck unit in FIG. 23 includes is fixed to a lower end portion of a spindle shaft by a screw.

The spindle head 166b is fixed to a lower end portion of the spindle shaft 166a by a screw 166d, as shown in FIG. 26. Four opening portions 166e are formed between the spindle head 166b and the spindle shaft 166a. The claw portions 164Ac to 165Bc of the respective hooks 164A to 165B are configured so as to be able to advance and withdraw through these opening portions 166e.

Figure 27:
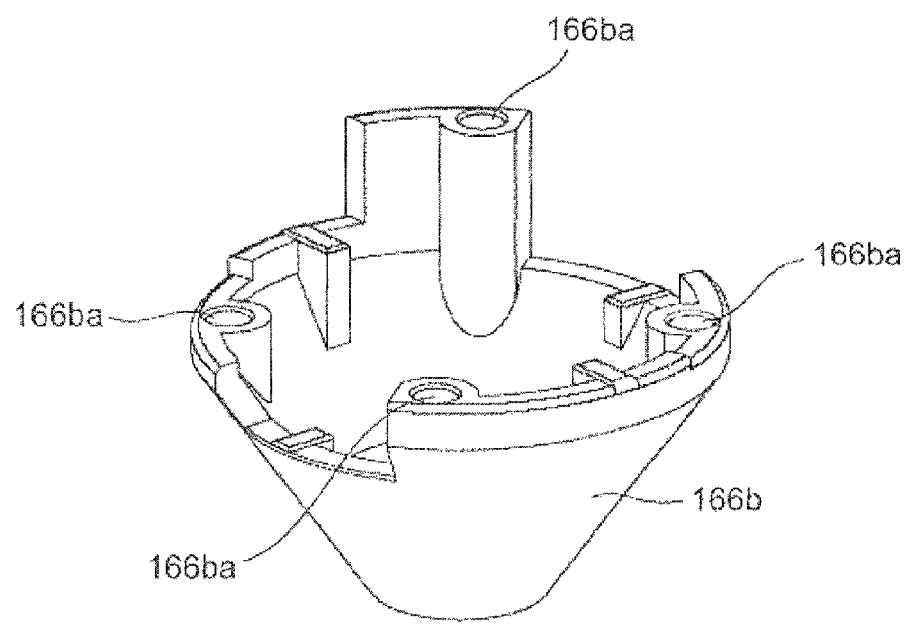
FIG. 27 is a perspective view of the spindle head that the disk chuck unit in FIG. 23 includes.
Figure 30C:
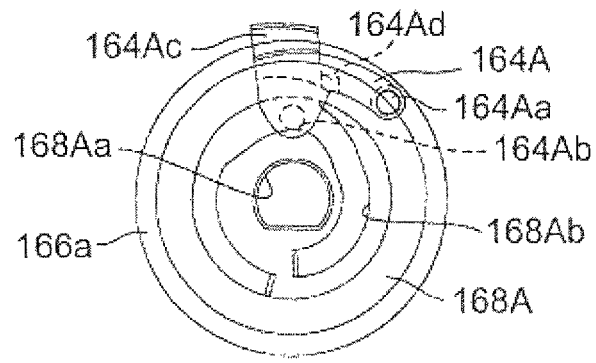
FIG. 30C is a view showing how a driving pin of one separator hook slides in a cam groove formed in an upper surface of one of the cam plates.
Figure 30D:
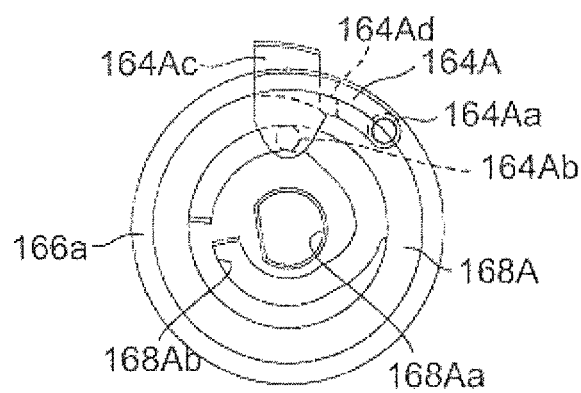
FIG. 30D is a view showing how a driving pin of one separator hook slides in a cam groove formed in an upper surface of one of the cam plates.
Figure 31A:
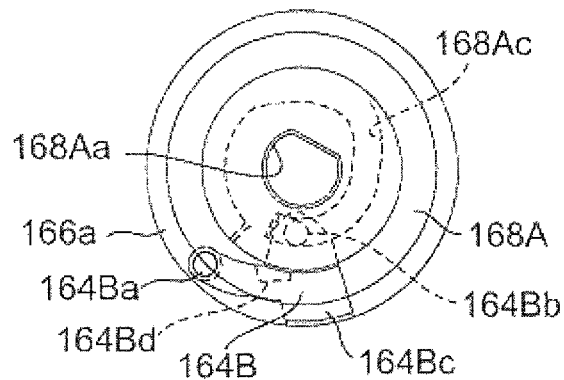
FIG. 31A is a view showing how a driving pin of the other separator hook slides in a cam groove formed in a lower surface of the one of the cam plates.
Figure 31B:
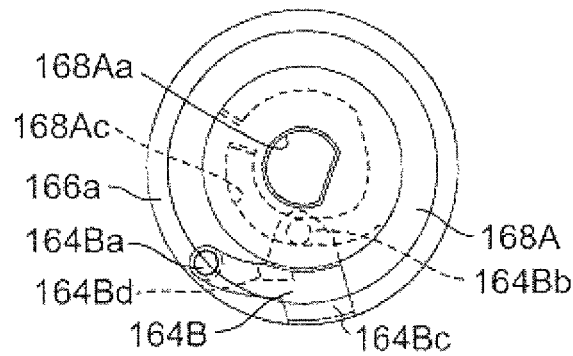
FIG. 31B is a view showing how a driving pin of the other separator hook slides in a cam groove formed in a lower surface of the one of the cam plates.
Figure 31C:
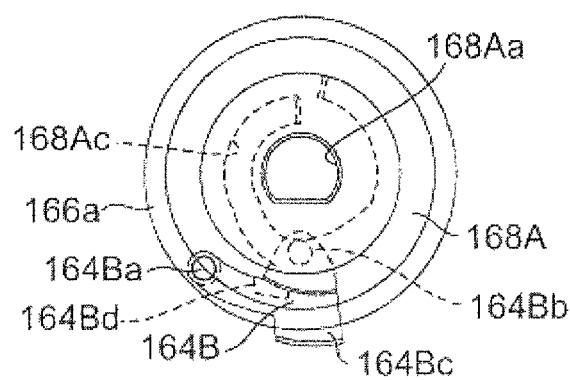
FIG. 31C is a view showing how a driving pin of the other separator hook slides in a cam groove formed in a lower surface of the one of the cam plates.
Figure 31D:
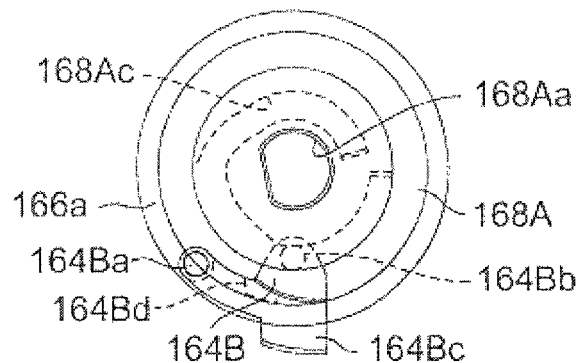
FIG. 31D is a view showing how a driving pin of the other separator hook slides in a cam groove formed in a lower surface of the one of the cam plates.
Figure 32A:
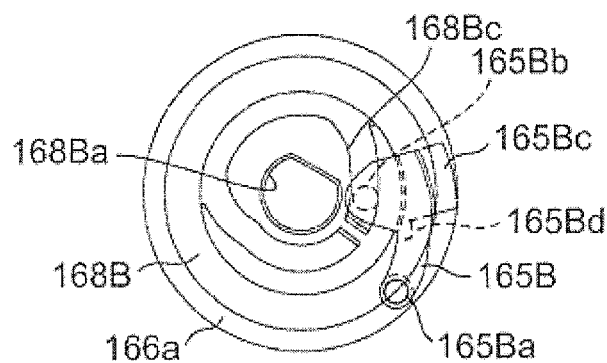
FIG. 32A is a view showing how a driving pin of one bottom hook slides in a cam groove formed in an upper surface of the other cam plate.
Figure 32B:
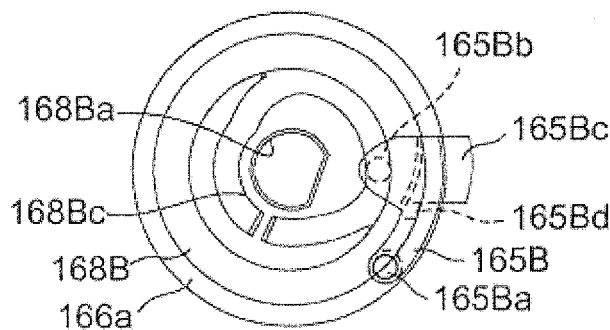
FIG. 32B is a view showing how a driving pin of one bottom hook slides in a cam groove formed in an upper surface of the other cam plate.
Figure 32C:
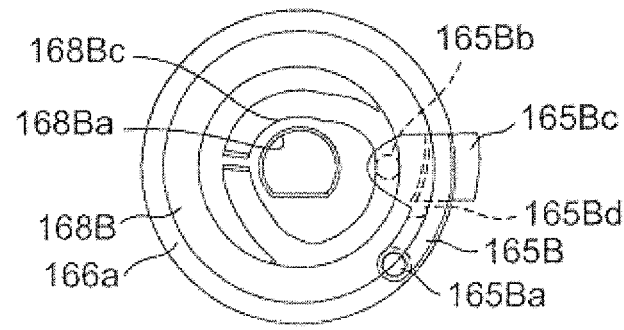
FIG. 32C is a view showing how a driving pin of one bottom hook slides in a cam groove formed in an upper surface of the other cam plate.
Figure 32D:
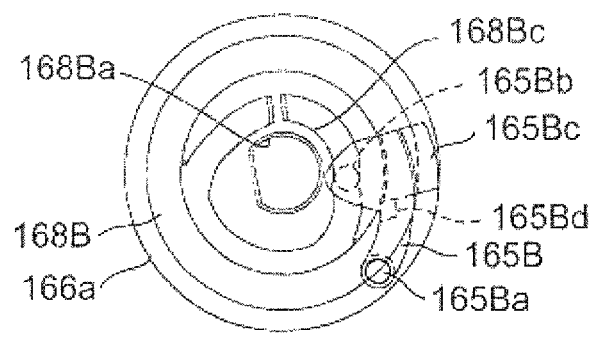
FIG. 32D is a view showing how a driving pin of one bottom hook slides in a cam groove formed in an upper surface of the other cam plate.
Figure 33A:
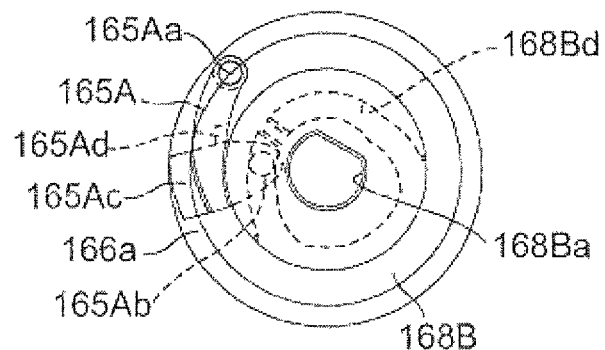
FIG. 33A is a view showing how a driving pin of the other bottom hook slides in a cam groove formed in a lower surface of the other cam plate.
Figure 33B:
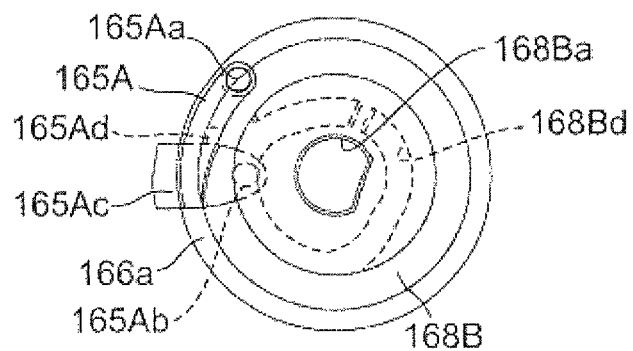
FIG. 33B is a view showing how a driving pin of the other bottom hook slides in a cam groove formed in a lower surface of the other cam plate.
Figure 33C:
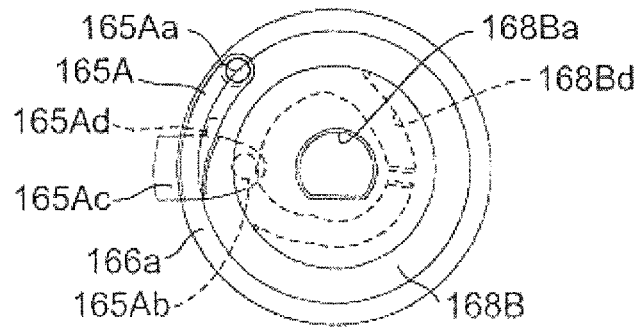
FIG. 33C is a view showing how a driving pin of the other bottom hook slides in a cam groove formed in a lower surface of the other cam plate.
Figure 33D:
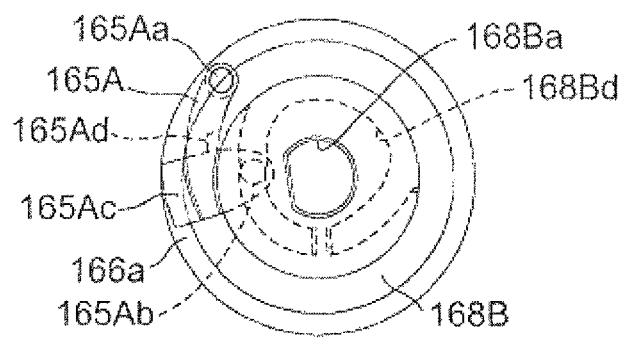
FIG. 33D is a view showing how a driving pin of the other bottom hook slides in a cam groove formed in a lower surface of the other cam plate.

In the spindle head 166b, four revolving shaft holes 166ba are provided, as shown in FIG. 27. Moreover, in the spindle shaft 166a, revolving shaft holes 166aa are provided at positions opposed to the revolving shaft holes 166ba, as shown in FIG. 26. The respective hooks 164A to 165B are held revolvably by inserting the revolving shafts 164Aa to 165Ba into the corresponding revolving shaft holes 166aa, 166ba, respectively. Moreover, the respective hooks 164A to 165B are held so that the upper surfaces of the claw portions 164Ac, 164Bc of the separator hooks 164A, 164B are located higher than the upper surfaces of the claw portions 165Ac, 165Bc of the bottom hooks 165A, 165B substantially by one disk, respectively. Furthermore, the separator hook 164A and the separator hook 164B are held at positions obtained by shifting a phase by 180 degrees in a circumferential direction of the spindle unit 166 with respect to each other, and the bottom hook 165A and the bottom hook 165B are held at positions obtained by shifting a phase by 180 degrees in the circumferential direction of the spindle unit 166.

In the present embodiment, the claw portions 164Ac, 164Bc of the separator hooks 164A, 164B configure separation claws that can support a lower-surface inner circumferential portion of the disk 100 located one higher than a lowermost portion. Moreover, in the present embodiment, the claw portions 165Ac, 165Bc of the bottom hooks 165A, 165B configure supporting claws that can support the lower-surface inner circumferential portion of the disk 100 located in the lowermost portion.

The cam shaft unit 167 includes a substantially cylindrical cam shaft 167a, a cam gear 167b provided in an upper end portion of the cam shaft 167a, and cam plates 168A, 168B provided in a lower end portion of the cam shaft 167a, as shown in FIG. 28.

In a central portion of the cam gear 167b, a revolving shaft hole 167b is provided. A revolving shaft 163a provided in the gear plate 163 is inserted into the revolving shaft hole 167ba, as shown in FIG. 20. The cam gear 167b is engaged with relay gears 170, as shown in FIG. 19. The relay gears 170 are made up of, for example, two gears, and in a central portion of each of the gears, a revolving shaft hole 170a is provided. A revolving shaft 163b provided in the gear plate 163 is inserted into each of the revolving shaft holes 170a, as shown in FIG. 22. The relay gears 170 are engaged with a motor gear 171a pressed into a driving shaft of a disk chuck motor 171 provided in the moving base 161, as shown in FIGS. 19 and 21.

When the disk chuck motor 171 is driven, driving force of the disk chuck motor 171 is transmitted to the cam shaft 167a through the motor gear 171a, the relay gears 170, and the cam gear 167b to rotate the cam shaft 167a around the revolving shaft 163a.

In the lower end portion of the cam shaft 167a, an engagement portion 167aa to be engaged with the cam plate 168A and an engagement portion 167ab to be engaged with the cam plate 168B are provided, as shown in FIG. 28. The engagement portions 167aa, 167ab are each formed with a cross section having a D shape.

In a central portion of the cam plate 168A, a D-shaped revolving shaft hole 168Aa is provided. The cam plate 168A is configured revolvably integrally with the cam shaft 167a by engaging the engagement portion 167aa of the cam shaft 167a with the revolving shaft hole 168Aa.

In an upper-surface central portion of the cam plate 168B, a D-shaped revolving shaft hole 168Ba is provided. The cam plate 168B is configured revolvably integrally with the cam shaft 167a by engaging the engagement portion 167ab of the cam shaft 167a with the revolving shaft hole 168Ba.

Moreover, in a lower-surface central portion of the cam plate 168B, a revolving shaft 168Bb is provided. The revolving shaft 168Bb is inserted into a revolving bearing 166ab provided in the lower end portion of the spindle shaft 166a, as shown in FIG. 23. In an assembled state shown in FIG. 19, the revolving shaft 168Bb is located coaxially with the revolving shaft 163a of the gear plate 163.

In an upper surface of the cam plate 168A, there is provided a cam groove 168Ab (refer to FIG. 28) in which the driving pin 164Ab of the separator hook 164A slides when the cam shaft 167a revolves. FIGS. 30A to 30D show how the driving pin 164Ab of the separator hook 164A slides in the cam groove 168Ab.

In a lower surface of the cam plate 168A, there is provided a cam groove 168Ac (refer to FIG. 29) in which the driving pin 164Bb of the separator hook 164B slides when the cam shaft 167a revolves. FIGS. 31A to 31D show how the driving pin 164Bb of the separator hook 164B slides in the cam groove 168Ac. The cam groove 168Ac has a mirror symmetric shape with the cam groove 168Ab, and is provided at a position obtained by shifting a phase from the cam groove 168Ab by 180 degrees in the circumferential direction of the spindle unit 166.

In an upper surface of the cam plate 168B, there is provided a cam groove 168Bc (refer to FIG. 28) in which the driving pin 165Bb of the bottom hook 165B slides when the cam shaft 167a revolves. FIGS. 32A to 32D show how the driving pin 165Bb of the bottom hook 165B slides in the cam groove 168Bc.

In a lower surface of the cam plate 168B, there is provided a cam groove 168Bd (refer to FIG. 29) in which the driving pin 165Ab of the bottom hook 165A slides when the cam shaft 167a revolves. FIGS. 33A to 33D show how the driving pin 165Ab of the bottom hook 165A slides in the cam groove 168Bd. The cam groove 168Bd has a mirror symmetric shape with the cam groove 168Bc, and is provided at a position obtained by shifting a phase from the cam groove 168Bc by 180 degrees in the circumferential direction of the spindle unit 166.

FIGS. 34A to 34D are views when positional relations of the cam shaft 167a and the four hooks 164A to 165B are noted.

Figure 34A:
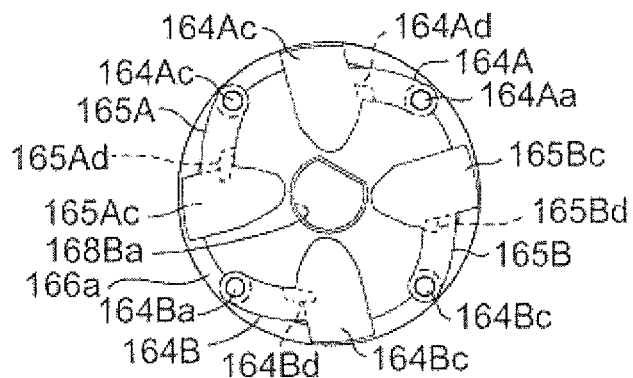
FIG. 34A is a view showing how the respective hooks shown in FIGS. 30A to 33D slide in the corresponding cam grooves while noting positional relations between the cam shaft and the respective hooks.
Figure 34B:
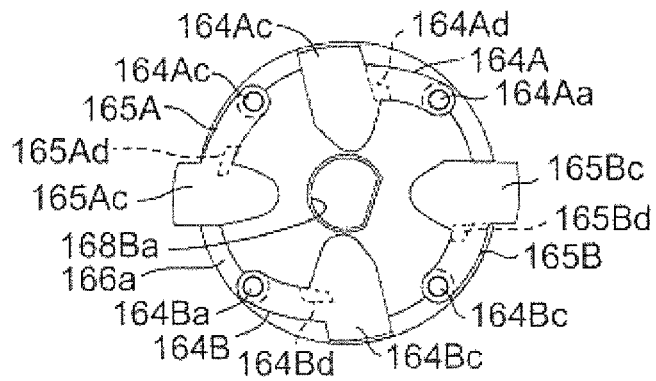
FIG. 34B is a view showing how the respective hooks shown in FIGS. 30A to 33D slide in the corresponding cam grooves while noting positional relations between the cam shaft and the respective hooks.
Figure 34C:
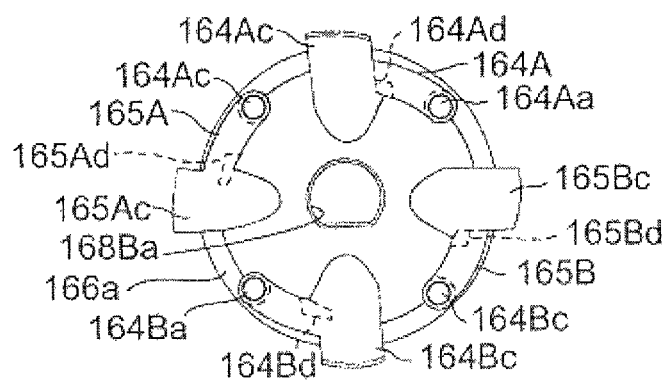
FIG. 34C is a view showing how the respective hooks shown in FIGS. 30A to 33D slide in the corresponding cam grooves while noting positional relations between the cam shaft and the respective hooks.
Figure 34D:
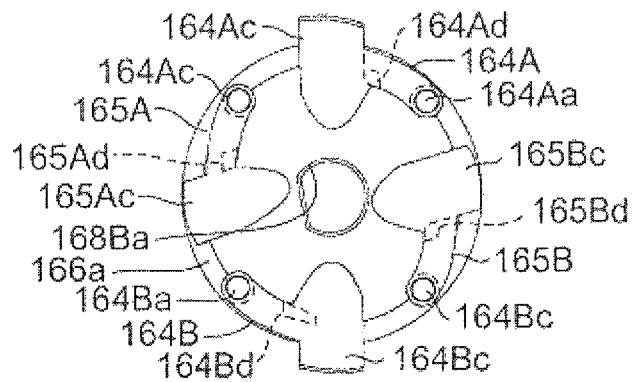
FIG. 34D is a view showing how the respective hooks shown in FIGS. 30A to 33D slide in the corresponding cam grooves while noting positional relations between the cam shaft and the respective hooks.

With the revolution of the cam shaft 167a, the separator hook 164A and the separator hook 164B move so that the claw portions 164Ac, 164Bc thereof are located at positions inside the spindle shaft 166a (refer to FIGS. 34A and 34B), are located at positions outside the spindle shaft 166a (refer to FIG. 34C), and are located at positions further outside the spindle shaft 166a (refer to FIG. 34D). In the separator hooks 164A, 164B, stoppers 164Ad, 164Bd are provided to restrict a revolution range.

Hereinafter, a position shown in FIG. 34A where all the hooks 164A to 165B are located inside the spindle shaft 166a is referred to as a contained position. Moreover, a position shown in FIG. 34B where only the bottom hooks 165A, 165B are located outside the spindle shaft 166a is referred to as a supporting position. A position shown in FIG. 34C where all the hooks 164A to 165B are located outside the spindle shaft 166a is referred to as a switching position. A position shown in FIG. 34D where the separator hooks 164A, 164B are located further outside the spindle shaft 166a, and the bottom hooks 165A, 165B are located inside the spindle shaft 166a is referred to as a separating position.

Next, referring to FIGS. 35 to 43, operation will be described, in which the carrier 106 separates one disk from the plurality of disks and places the separated disk on the tray 4a of the disk drive 4.

In FIGS. 35 to 43, for convenience of the description, the claw portions 164Ac, 164Bc of the separator hooks 164A, 164B, and the claw portions 165Ac, 165Bc of the bottom hooks 165A, 165B are illustrated on the same cross section. Moreover, here, a description will be started at a state where the lift pins 52a push out the plurality of disks 100 from the magazine tray 21.

Figure 35:
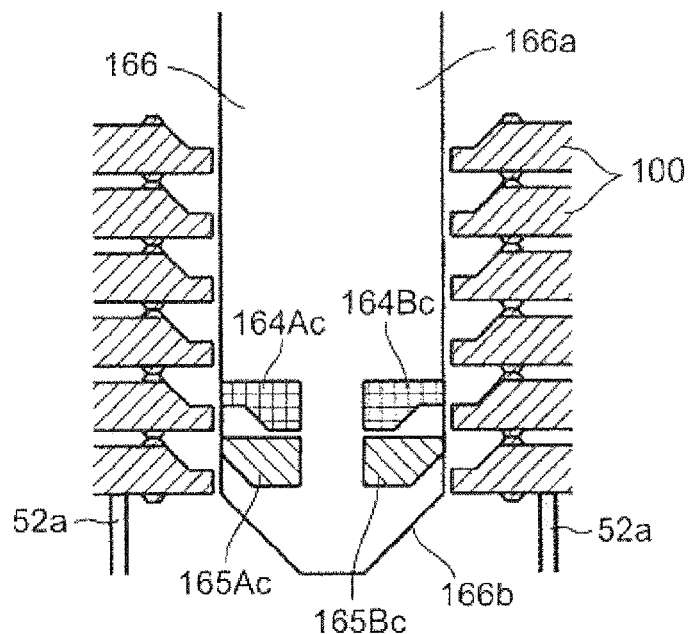
FIG. 35 is a view schematically showing how the carrier in FIG. 19 separates one disk from a plurality of disks.

When the lift pins 52a push out the plurality of disks 100, the spindle unit 166 is inserted into the central holes 100a of the plurality of disks 100, as shown in FIG. 35. At this time, the respective hooks 164A to 165B are located in the contained position (refer to FIG. 34A).

Figure 36:
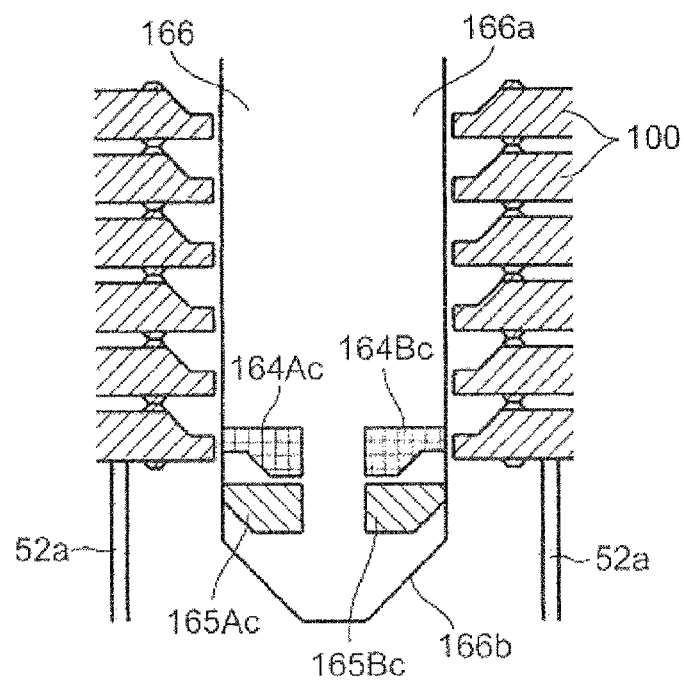
FIG. 36 is a view schematically showing how the carrier in FIG. 19 separates one disk from a plurality of disks.
Figure 37:
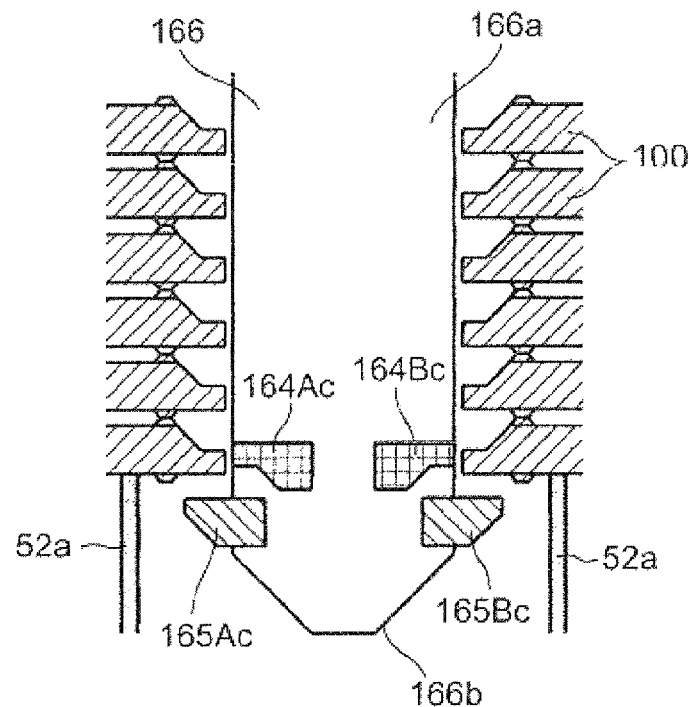
FIG. 37 is a view schematically showing how the carrier in FIG. 19 separates one disk from a plurality of disks.

As shown in FIG. 36, when the lift pins 52a pushes out the plurality of disks 100 until the claw portions 165Ac, 165Bc of the bottom hooks 165A, 165B are located below the disk located in the lowermost portion among the plurality of disks, the disk chuck motor 171 (refer to FIG. 21) is driven to rotate the cam shaft 167a in a positive direction around an axis. This moves the respective hooks 164A to 165B from the contained position (refer to FIG. 34A) to the supporting position (refer to FIG. 34B), as shown in FIG. 37.

Figure 38:
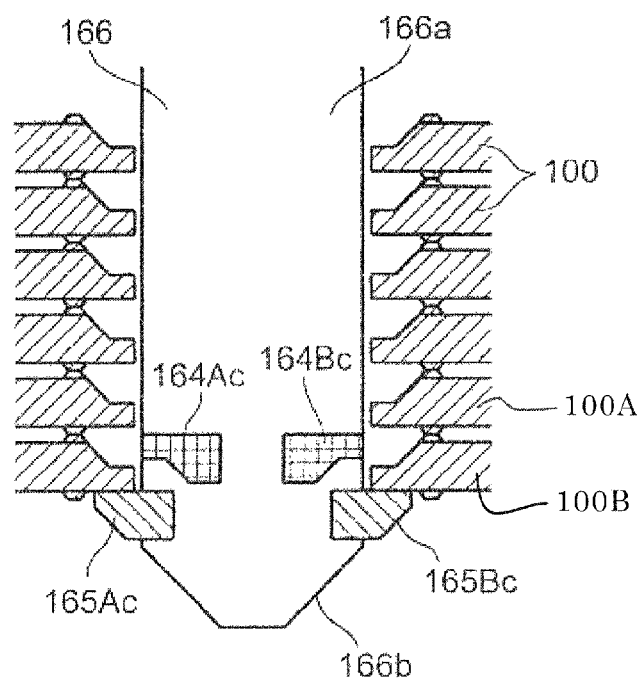
FIG. 38 is a view schematically showing how the carrier in FIG. 19 separates one disk from a plurality of disks.

As shown in FIG. 38, when the movement base 161 is moved up, the upper surfaces of the claw portions 165Ac, 165Bc of the bottom hooks 165A, 165B come into contact with the inner circumferential portion of the lowermost disk 100 to support all the disks 100. At this time, the engagement between the spindle head 166b and the engagement portion 23a of the core rod 23 (refer to FIG. 2B) is released. Moreover, the claw portions 164Ac, 164Bc of the separator hooks 164A, 164B are positioned so as to be able to be inserted into a gap formed between the lowermost disk 100B and the disk 100A one higher than the lowermost disk 100B, that is, the depressed portion 100b of the lowermost disk 100, which is the release portion. Conventionally, a gap obtained by causing the lower surface-side annular rib 101b of the upper disk 100A and the upper surface-side annular rib 101a of the lower disk 100B to abut on each other has been simply formed. In the present embodiment, the depressed portion 100b of the lowermost disk 100B largely expands this gap.

Figure 39:
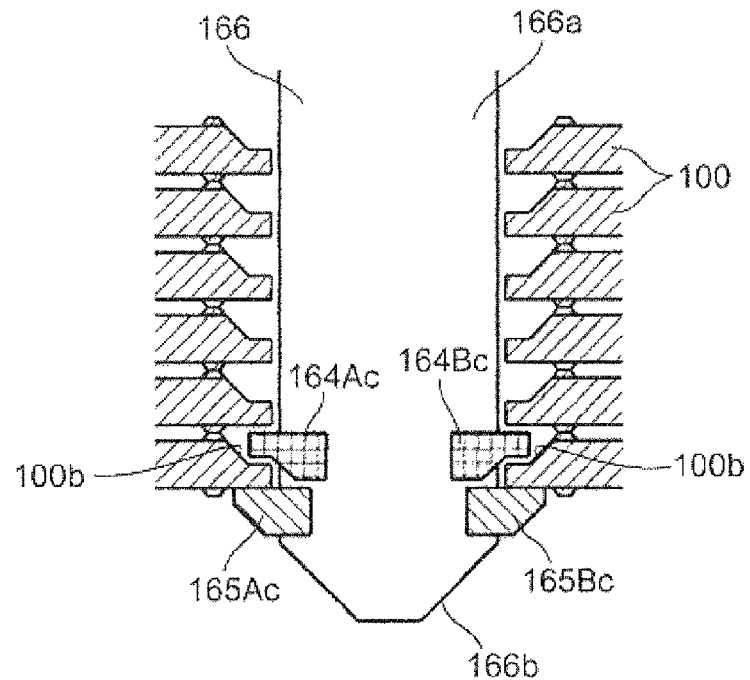
FIG. 39 is a view schematically showing how the carrier in FIG. 19 separates one disk from a plurality of disks.

The disk chuck motor 171 (refer to FIG. 21) is further driven to further rotate the cam shaft 167a in the positive direction. This moves the respective hooks 164A to 165B from the supporting position (refer to FIG. 34B) to the switching position (refer to FIG. 34C). As shown in FIG. 39, the claw portions 164Ac, 164Bc of the separator hooks 164A, 164B are inserted into the gap between the lowermost disk 100B and the disk 100A located one higher than the lowermost disk 100B. This gap is expanded by the depressed portion 100b (the release portion) formed in the lowermost disk 100, as described before. Accordingly, even if an insertion position of the spindle unit 166 is displaced vertically, or a thickness of the claw portions 164Ac, 164Bc is increased to increase strength, the claw portions 164Ac, 164Bc are allowed to surely enter the depressed portion 100b.

The picker 3 moves toward the device front side, so that the magazine tray 21 is withdrawn from the vicinity of the disk drive 4. Thereafter, the tray 4a of the disk drive 4 is ejected.

Figure 40:
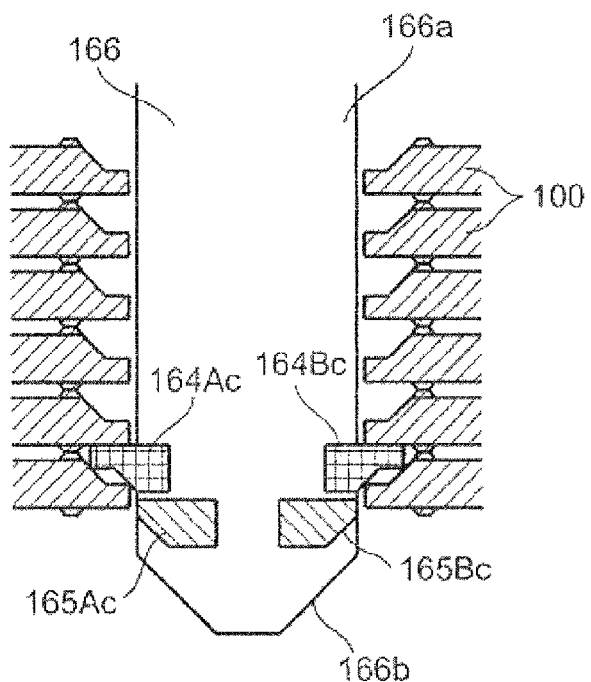
FIG. 40 is a view schematically showing how the carrier in FIG. 19 separates one disk from a plurality of disks.
Figure 41:
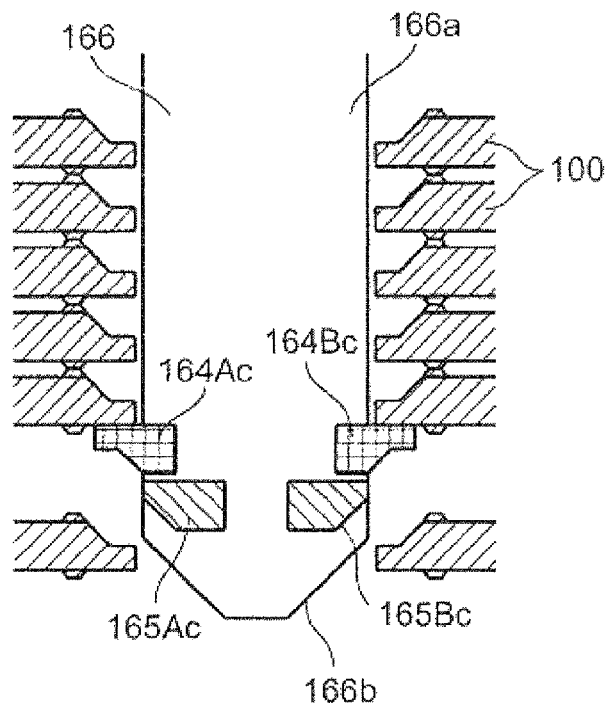
FIG. 41 is a view schematically showing how the carrier in FIG. 19 separates one disk from a plurality of disks.

The moving base 161 is moved down so that the plurality of disks 100 held by the spindle unit 166 are located above (e.g., immediately above) the tray 4a. In this state, the disk chuck motor 171 is further driven to further rotate the cam shaft 167a in the positive direction. This moves the respective hooks 164A to 165B from the switching position (refer to FIG. 34C) to the separating position (refer to FIG. 34D), and as shown in FIG. 40, the claw portions 165Ac, 165Bc of the bottom hooks 165A, 165B move to the positions inside the spindle shaft 166a. As a result, as shown in FIG. 41, the lowermost disk 100 falls due to its own weight to be placed on the tray 4a. At this time, the separator hooks 164A, 164B are projected outside the spindle shaft 166a, so that the inclined surfaces formed in the lower surfaces of the claw portions 164Ac, 164Bc of the separator hooks 164A, 164B press the lowermost disk 100 downward, thereby functioning to assist the disk 100 in falling due to its own weight. Moreover, the upper surfaces of the claw portions 164Ac, 164Bc of the separator hooks 164A, 164B come into contact with the inner circumferential portion of the lowermost disk 100 of the remaining disks to support the remaining disks 100.

As for the lowermost disk 100 placed on the tray 4a, the moving base 161 is moved up so that the spindle unit 166 and the tray 4a do not make contact with each other. Thereafter, the tray 4a is conveyed into the disk drive 4. Thereafter or at the same time, the tray 4a of the disk drive 4 opposed to the relevant disk drive is ejected (not shown).

Figure 42:
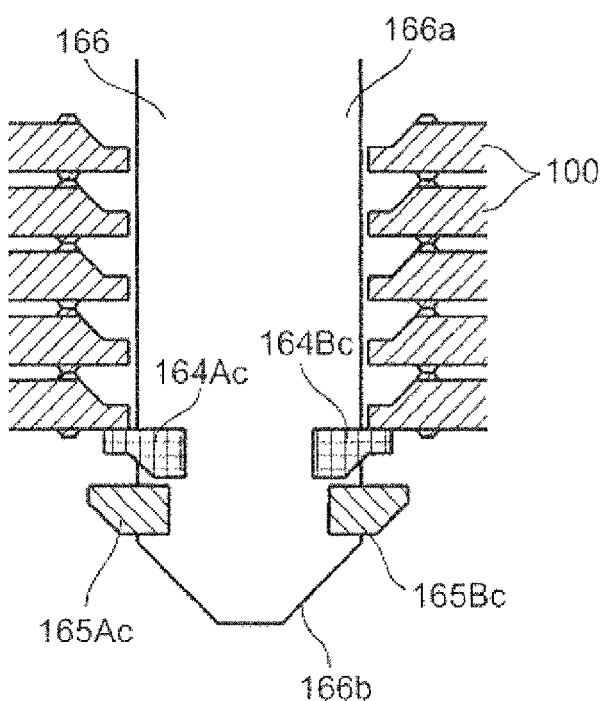
FIG. 42 is a view schematically showing how the carrier in FIG. 19 separates one disk from a plurality of disks.

The disk chuck motor 171 is driven reversely to rotate the cam shaft 167a in a reverse direction. This moves the respective hooks 164A to 165B from the separating position (refer to FIG. 34D) to the switching position (refer to FIG. 34C), thereby moving the claw portions 165Ac, 165Bc of the bottom hooks 165A, 165B to the positions outside the spindle shaft 166a, as shown in FIG. 42.

Figure 43:
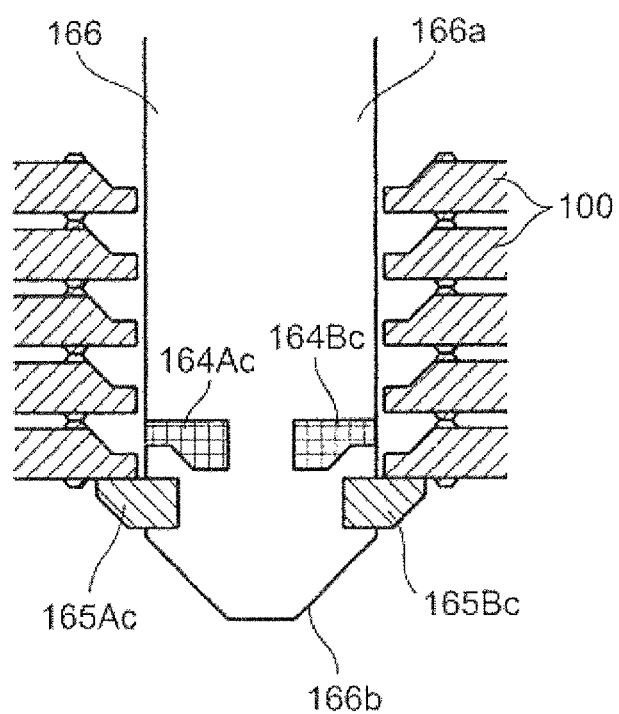
FIG. 43 is a view schematically showing how the carrier in FIG. 19 separates one disk from a plurality of disks.

The disk chuck motor 171 is further driven reversely to further rotate the cam shaft 167a in the reverse direction. This moves the respective hooks 164A to 165B from the switching position (refer to FIG. 34C) to the supporting position (refer to FIG. 34B), and as shown in FIG. 43, the claw portions 164Ac, 164Bc of the separator hooks 164A, 164B move to the positions inside the spindle shaft 166a. As a result, the remaining disks 100 supported by the upper surfaces of the claw portions 164Ac, 164Bc of the separator hooks 164A, 164B fall due to their own weights to be supported by the upper surfaces of the claw portions 165Ac, 165Bc of the bottom hooks 165A, 165B.

The disk chuck motor 171 (refer to FIG. 21) is driven to rotate the cam shaft 167a in the positive direction. This moves the respective hooks 164A to 165B from the supporting position (refer to FIG. 34B) to the switching position (refer to FIG. 34C), and as shown in FIG. 39, the claw portions 164Ac, 164Bc of the separator hooks 164A, 164B are inserted into the depressed portion 100b of the lowermost disk 100.

The moving base 161 is moved down so that the plurality of disks 100 held by the spindle unit 166 are located above (e.g., immediately above) the above-described ejected tray 4a. In this state, the disk chuck motor 171 is further driven to further rotate the cam shaft 167a in the positive direction. This moves the respective hooks 164A to 165B from the switching position (refer to FIG. 34C) to the separating position (refer to FIG. 34D), and as shown in FIG. 40, the claw portions 165Ac, 165Bc of the bottom hooks 165A, 165B move to the positions inside the spindle shaft 166a. As a result, as shown in FIG. 41, the lowermost disk 100 falls due to its own weight to be placed on the tray 4a. At this time, the separator hooks 164A, 164B are projected further outside the spindle shaft 166a, so that the inclined surfaces formed in the lower surfaces of the claw portions 164Ac, 164Bc of the separator hooks 164A, 164B press the lowermost disk 100 downward, thereby functioning to assist the disk 100 in falling due to its own weight. Moreover, at this time, the upper surfaces of the claw portions 164Ac, 164Bc of the separator hooks 164A, 164B come into contact with the inner circumferential portion of the lowermost disk of the remaining disks to support the remaining disks 100.

When the lowermost disk 100 is placed on the tray 4a, the moving base 161 is moved up so that the spindle unit 166 and the tray 4a do not make contact with each other. Thereafter, the tray 4a is conveyed into the disk drive 4. This completes loading operation on the disk drive 4 at a lowermost stage (first stage). This loading operation is repeated in a second stage and later.

When the loading operation on the disk drives 4 in an uppermost stage is completed, the disks 100 are conveyed to all the disk drives 4, and recording or reproduction of the disks 100 in all the disk drives 4 is enabled.

Next, operation in which the carrier 106 collects the disks 100 from the respective disk drives 4 will be described.

First, the tray 4a of the disk drive 4 in the uppermost stage is ejected.

The moving base 161 is moved down to insert the spindle unit 166 into the central hole 100a of the disk 100 on the relevant tray 4a. At this time, the respective hooks 164A to 165B are in the contained position (refer to FIG. 34A).

When the moving base 161 moves down until the disk 100 is located above the bottom hooks 165A, 165B, the disk chuck motor 171 (refer to FIG. 21) is driven to rotate the cam shaft 167a in the positive direction. This moves the respective hooks 164A to 165B from the contained position (refer to FIG. 34A) to the supporting position (refer to FIG. 34B).

The moving base 161 is moved up, so that the upper surfaces of the claw portions 165Ac, 165Bc of the bottom hooks 165A, 165B come into contact with the inner circumferential portion of the disk 100 to hold the relevant disk 100. This allows the disk 100 on the tray 4a to be collected.

The tray 4a from which the disk 100 is collected is conveyed into the disk drive 4. Thereafter or at the same time, the tray 4a of the disk drive 4 opposed to the relevant disk drive 4 is ejected.

The moving base 161 is moved down so that the disk held by the spindle unit 166 is located above (e.g., immediately above) the disk 100 on the above-described ejected tray 4a.

The disk chuck motor 171 (refer to FIG. 21) is driven reversely to rotate the cam shaft 167a in the reverse direction. This moves the respective hooks 164A to 165B from the supporting position (refer to FIG. 34B) to the contained position (refer to FIG. 34A). This allows the disk 100 held by the spindle unit 166 to fall due to its own weight and be stacked on the disk 100 on the above-described ejected tray 4a.

The moving base 161 is moved down to insert the spindle unit 166 into the central holes 100a of the two disks 100 on the above-described ejected tray 4a.

When the moving base 161 moves down until the two disks 100 are located above the bottom hooks 165A, 165B, the disk chuck motor 171 (refer to FIG. 21) is driven to rotate the cam shaft 167a in the positive direction. This moves the respective hooks 164A to 165B from the contained position (refer to FIG. 34A) to the supporting position (refer to FIG. 34B).

The moving base 161 is moved up, and the upper surfaces of the claw portions 165Ac, 165Bc of the bottom hooks 165A, 165B come into contact with the inner circumferential portion of the lowermost disk 100 to support all the disks 100.

The tray 4a from which the disk 100 is collected is conveyed into the disk drive 4. This completes the disk collection operation of the disk drives 4 in the uppermost (first) stage. This disk collection operation is repeated until the disks 100 inside the disk drives 4 in the lowermost stage are collected.

When the spindle unit 166 collects all the disks 100, the moving base 161 is moved up. Thereafter, the picker 3 moves toward the device back side to set the magazine tray 21 below the spindle unit 166.

The moving base 161 is moved down, so that the spindle head 166b (refer to FIG. 21) is engaged with the engagement portion 23a of the core rod 23 (refer to FIG. 2B), thereby making the spindle head 166b and the core rod 23 coaxial.

The disk chuck motor 171 (refer to FIG. 21) is driven reversely to rotate the cam shaft 167a in the reverse direction. This moves the respective hooks 164A to 165B from the supporting position (refer to FIG. 34B) to the contained position (refer to FIG. 34A). This allows all the disks 100 held by the spindle unit 166 to fall due to their own weights along the spindle head 166b and the core rod 23 and be contained inside the magazine tray 21.

The moving base 161 is moved up to release the engagement between the spindle head 166b and the engagement portion 23a of the core rod 23.

The magazine tray 21, which has contained all the disks 100, is returned into the magazine stocker 1 by the picker 3. The conveyance of the magazine tray 21 into this magazine stocker 1 is performed by performing the operation described with reference to FIGS. 6 to 15 and the reverse operation.

According to the disk device of the present embodiment, the plurality of disks 100 are held by the carrier 106 in the stacked state, and one of the disks is separated from the plurality of disks above the tray 4a of each of the disk drives 4. This can largely shorten time required for conveying the disks 100 to the respective plurality of disk drives 4, as compared with the conventional disk device that conveys the disks one by one from the magazine to the disk drives.

Arbitrary embodiments of the above-described various embodiments are combined as needed, by which effects that the respective embodiments have can be exerted.

Moreover, while in the above-described embodiments, the disk 100B located one higher than the lowermost disk 100A of the stacked disks 100 is supported by the separation claws (the claw portions 164Ac, 164Bc of the separator hooks 164A, 164B) of the carrier 106, the disk 100 at an arbitrary position may be supported to thereby enable the plurality of disks 100 to be ejected at once.

Although the present disclosure has been fully described in connection with the preferred embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

Since the disk device according to the present disclosure can reduce time required for supplying the disks to the respective plurality of disk drives, the present disclosure is particularly useful for a disk device including a number of magazines.

What is claimed is:

1. A disk comprising:
   an inner circumferential surface which defines a central hole; and
   a supportable structure in an inner circumferential portion of the disk, the supportable structure enabling a disk located one higher than an arbitrary disk to be supported by separation claws which project toward an outer diameter side from the central hole,
   wherein the supportable structure is configured as a depressed portion formed in the inner circumferential surface of the disk, the depressed portion extending toward the outer diameter side.

2. The disk according to claim 1, wherein the depressed portion is formed on an upper side of the disk.

3. The disk according to claim 1, wherein the depressed portion is formed on a lower side of the disk.

4. The disk according to claim 2, wherein the depressed portion has a horizontal surface extending from the inner circumferential surface of the disk, and a tapered surface expanding upward from the horizontal surface toward the outer diameter side.

5. The disk according to claim 3, wherein the depressed portion opens only at the inner circumferential surface of the disk.

6. A disk comprising:
   an inner circumferential surface which defines a central hole; and a supportable structure in an inner circumferential portion of the disk, the supportable structure enabling a disk located one higher than an arbitrary disk to be supported by separation claws which project toward an outer diameter side from the central hole, wherein the supportable structure is configured by a projected portion which projects inwardly from the inner circumferential surface of the disk.

7. The disk according to claim 1, further comprising a rib projected from at least any one of an upper surface or a lower surface of the inner circumferential portion of the disk.

\* \* \* \* \*